US010923238B2

(12) United States Patent
Abbott et al.

(10) Patent No.: US 10,923,238 B2
(45) Date of Patent: Feb. 16, 2021

(54) DIRECT REACTOR AUXILIARY COOLING SYSTEM FOR A MOLTEN SALT NUCLEAR REACTOR

(71) Applicant: TerraPower, LLC, Bellevue, WA (US)

(72) Inventors: Ryan Abbott, Woodinville, WA (US); Anselmo T. Cisneros, Jr., Seattle, WA (US); Daniel Flowers, Sebastopol, CA (US); Charles Gregory Freeman, Kirkland, WA (US); Mark A. Havstad, Esparto, CA (US); Kevin Kramer, Redmond, WA (US); Jeffery F. Latkowski, Mercer Island, WA (US); Jon D. McWhirter, Kirkland, WA (US); John R. Suyes, III, Tacoma, WA (US)

(73) Assignee: TerraPower, LLC, Bellevue, WA (US)

(*) Notice: Subject to any disclaimer, the term of this patent is extended or adjusted under 35 U.S.C. 154(b) by 190 days.

(21) Appl. No.: 15/813,901

(22) Filed: Nov. 15, 2017

(65) Prior Publication Data

US 2018/0137944 A1 May 17, 2018

Related U.S. Application Data

(60) Provisional application No. 62/422,474, filed on Nov. 15, 2016.

(51) Int. Cl.
*G21C 3/54* (2006.01)
*G21C 15/06* (2006.01)
(Continued)

(52) U.S. Cl.
CPC .............. *G21C 3/54* (2013.01); *G21C 11/06* (2013.01); *G21C 15/06* (2013.01); *G21C 15/26* (2013.01); *Y02E 30/38* (2013.01)

(58) Field of Classification Search
CPC ........ G21C 15/06; G21C 15/18; G21C 11/06; G21C 3/54
See application file for complete search history.

(56) References Cited

U.S. PATENT DOCUMENTS

| 2,375,009 A | 5/1945 | Lepsoe |
| 2,874,106 A * | 2/1959 | Philip ...................... G21C 1/26 |
| | | 376/300 |

(Continued)

FOREIGN PATENT DOCUMENTS

| CA | 631890 A | 11/1961 |
| DE | 1112791 | 8/1961 |

(Continued)

OTHER PUBLICATIONS

Clarno, K. T., et al. "Trade studies for the liquid-salt-cooled very high-temperature reactor: fiscal year 2006 progress report." ORNL/TM-2006 140 (2007). full 264-page document available online via Google Scholar. (Year: 2007).*

(Continued)

*Primary Examiner* — Lily C Garner

(57) ABSTRACT

This disclosure describes various configurations and components of a molten fuel fast or thermal nuclear reactor for managing the operating temperature in the reactor core. The disclosure includes various configurations of direct reactor auxiliary cooling system (DRACS) heat exchangers and primary heat exchangers as well as descriptions of improved flow paths for nuclear fuel, primary coolant and DRACS coolant through the reactor components.

14 Claims, 17 Drawing Sheets

(51) Int. Cl.
*G21C 11/06* (2006.01)
*G21C 15/26* (2006.01)

(56) References Cited

U.S. PATENT DOCUMENTS

| | | | |
|---|---|---|---|
| 2,920,024 A | 1/1960 | Barton et al. | |
| 2,945,794 A | 7/1960 | Winters et al. | |
| 3,018,239 A | 1/1962 | Happell | |
| 3,029,130 A | 4/1962 | Moore | |
| 3,046,212 A | 7/1962 | Anderson | |
| 3,136,700 A | 6/1964 | Poppendiek et al. | |
| 3,216,901 A | 11/1965 | Teitel | |
| 3,218,160 A | 11/1965 | Knighton et al. | |
| 3,262,856 A | 7/1966 | Bettis | |
| 3,287,225 A | 11/1966 | Ackroyd et al. | |
| 3,383,285 A | 5/1968 | Ackroyd et al. | |
| 3,450,198 A * | 6/1969 | Brunner | F28D 7/085 |
| | | | 165/101 |
| 3,785,924 A | 1/1974 | Notari | |
| 3,909,351 A * | 9/1975 | Tilliette | G21C 1/326 |
| | | | 376/295 |
| 3,996,099 A | 12/1976 | Faugeras | |
| 3,997,413 A | 12/1976 | Fougner | |
| 4,039,377 A | 8/1977 | Andrieu | |
| 4,045,286 A * | 8/1977 | Blum | G21C 1/03 |
| | | | 376/360 |
| 4,056,435 A | 11/1977 | Carlier | |
| 4,216,821 A * | 8/1980 | Robin | F22B 1/066 |
| | | | 165/11.1 |
| 4,342,721 A | 8/1982 | Pomie | |
| 4,397,778 A | 8/1983 | Lloyd | |
| 4,762,667 A * | 8/1988 | Sharbaugh | G21C 1/03 |
| | | | 376/298 |
| 5,185,120 A | 2/1993 | Fennern | |
| 5,196,159 A | 3/1993 | Kawashima | |
| 5,223,210 A | 6/1993 | Hunsbedt | |
| 5,380,406 A | 1/1995 | Horton | |
| 5,421,855 A | 6/1995 | Hayden | |
| 6,181,759 B1 | 1/2001 | Heibel | |
| 7,217,402 B1 | 5/2007 | Miller | |
| 8,416,908 B2 | 4/2013 | Mann | |
| 8,594,268 B2 * | 11/2013 | Shu | G21C 13/02 |
| | | | 376/347 |
| 8,734,738 B1 | 5/2014 | Herrmann | |
| 9,171,646 B2 | 10/2015 | Moses et al. | |
| 10,043,594 B2 * | 8/2018 | Scott | G21C 3/54 |
| 10,438,705 B2 | 10/2019 | Cheatham | |
| 10,497,479 B2 | 12/2019 | Abbott et al. | |
| 2004/0114703 A1 | 6/2004 | Bolton | |
| 2005/0220251 A1 | 10/2005 | Yokoyama | |
| 2008/0310575 A1 * | 12/2008 | Cinotti | G21C 1/00 |
| | | | 376/210 |
| 2011/0222642 A1 * | 9/2011 | Gautier | G21C 1/02 |
| | | | 376/395 |
| 2011/0286563 A1 | 11/2011 | Moses | |
| 2012/0051481 A1 * | 3/2012 | Shu | G21C 5/02 |
| | | | 376/174 |
| 2012/0056125 A1 | 3/2012 | Raade | |
| 2012/0183112 A1 | 7/2012 | Leblanc | |
| 2012/0288048 A1 * | 11/2012 | Mann | G21C 5/02 |
| | | | 376/220 |
| 2012/0314829 A1 * | 12/2012 | Greene | F01K 3/00 |
| | | | 376/322 |
| 2013/0083878 A1 | 4/2013 | Massie | |
| 2013/0180520 A1 | 7/2013 | Raade | |
| 2014/0166924 A1 | 6/2014 | Raade | |
| 2014/0348287 A1 | 11/2014 | Huke et al. | |
| 2015/0010875 A1 | 1/2015 | Raade | |
| 2015/0117589 A1 | 1/2015 | Kamei | |
| 2015/0036779 A1 * | 2/2015 | Leblanc | G21C 1/22 |
| | | | 376/207 |
| 2015/0078504 A1 | 3/2015 | Woolley | |
| 2015/0228363 A1 | 8/2015 | Dewan | |
| 2015/0243376 A1 | 8/2015 | Wilson | |
| 2015/0357056 A1 | 12/2015 | Shayer | |
| 2016/0005497 A1 | 1/2016 | Scott | |
| 2016/0189806 A1 | 6/2016 | Cheatham, III et al. | |
| 2016/0189812 A1 * | 6/2016 | Czerwinski | G21C 7/30 |
| | | | 376/212 |
| 2016/0189813 A1 | 6/2016 | Cisneros | |
| 2016/0196885 A1 * | 7/2016 | Singh | F22B 1/026 |
| | | | 376/367 |
| 2016/0217874 A1 | 7/2016 | Dewan | |
| 2016/0260509 A1 | 9/2016 | Kim et al. | |
| 2017/0084355 A1 | 3/2017 | Scott | |
| 2017/0092381 A1 | 3/2017 | Cisneros | |
| 2017/0117065 A1 | 4/2017 | Scott | |
| 2017/0301413 A1 | 10/2017 | Cisneros | |
| 2017/0301421 A1 * | 10/2017 | Abbott | G21C 1/026 |
| 2017/0316840 A1 * | 11/2017 | Abbott | G21C 1/03 |
| 2017/0316841 A1 | 11/2017 | Abbott et al. | |
| 2018/0019025 A1 | 1/2018 | Abbott et al. | |
| 2018/0047467 A1 | 2/2018 | Czerwinski | |
| 2018/0068750 A1 | 3/2018 | Cisneros | |
| 2019/0237205 A1 * | 8/2019 | Abbott | G21C 7/30 |
| 2020/0027590 A1 | 1/2020 | Cisneros | |
| 2020/0118698 A1 | 4/2020 | Cheatham | |
| 2020/0122109 A1 | 4/2020 | Kruizenga | |
| 2020/0185114 A1 | 6/2020 | Abbott | |

FOREIGN PATENT DOCUMENTS

| | | | |
|---|---|---|---|
| DE | 1439107 | 2/1969 | |
| EP | 0617430 | 9/1994 | |
| FR | 2296248 | 7/1976 | |
| GB | 739968 | 11/1955 | |
| GB | 835266 | 5/1960 | |
| GB | 964841 | 7/1964 | |
| GB | 2073938 | 10/1981 | |
| GB | 2073938 A * | 10/1981 | G21G 1/10 |
| GB | 2508537 | 12/2014 | |
| JP | S57 1991 | 1/1982 | |
| JP | 1991282397 | 12/1991 | |
| JP | 2001-133572 | 5/2001 | |
| JP | 2014-119429 | 6/2014 | |
| RU | 57040 U1 | 9/2006 | |
| RU | 2424587 C1 | 7/2011 | |
| WO | WO 2013/116942 | 8/2013 | |
| WO | WO 2014/0128457 | 8/2014 | |
| WO | WO-2014196338 A1 * | 12/2014 | F28F 21/067 |
| WO | WO 2013/180029 | 5/2015 | |
| WO | WO 2014/074930 | 5/2015 | |
| WO | WO 2015/140495 | 9/2015 | |
| WO | WO 2016/109565 | 7/2016 | |
| WO | WO 2018013317 | 1/2018 | |

OTHER PUBLICATIONS

PCT/US2017/061843 International Search Report, dated Oct. 29, 2018, 23 pages.
PCT International Preliminary Report on Patentability in International Application PCT/US2017/061843, dated May 21, 2019, 13 pages.
PCT International Search Report and Written Opinion in International Application PCT/US2017/038806, dated Oct. 16, 2017, 13 pgs.
PCT International Preliminary Report on Patentability in International Application PCT/US2017/038806, dated Jan. 15, 2019, 7 pgs.
Mourogov et al., Potentialities of the fast spectrum molten salt reactor concept: REBUS-3700, Energy Conversion and Management, Mar. 30, 2006, vol. 47, No. 17, pp. 2761-2771.
PCT International Preliminary Report on Patentability in International Application PCT/US2017/030455, dated Nov. 6, 2018, 17 pages.
PCT International Preliminary Report on Patentability in International Application PCT/US2017/030457, dated Nov. 15, 2018, 15 pages.
PCT International Search Report and Written Opinion in International Application PCT/US2017/030455, dated Jan. 30, 2018, 23 pages.

(56) References Cited

OTHER PUBLICATIONS

PCT International Search Report and Written Opinion in International Application PCT/US2017/030457, dated Jan. 23, 2018, 20 pages.
Abbott et al, Thermal and Mechanical Design Aspects of the LIFE Engine, Fusion Science and Technology Dec. 2008; 56(2), 7 pages.
Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.
ASTM International, Designation: B898-11, Standard Specification for Reactive and Refractory Metal Clad Plate (Sep. 2011), 15 pages.
Cohen et al., "Vanadium-Lined HT9 Cladding Tubes", Argonne National Lab ANL/ET/CP-80384, (Feb. 1994), 12 pgs.
European Extended Search Report for EP 15876187.4 dated Sep. 11, 2018, 10 pages.
Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.
Forsberg et al., Fluoride-Salt-Cooled High-Temperature Reactor (FHR) for Power and Process Heat, Final Project Report, MIT-ANP-TR-157, Dec. 2014, 62 pgs.
Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.
Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.
Freeman et al., "Archimedes Plasma Mass Filter", AIP Cont. Proc. 694, 403 (2003), 9 pages.
GEN IV International Forum, Molten Salt Reactor (MSR), https://www.gen-4.org/gif/jcms/c_9359/msr, accessed Feb. 26, 2016, 3 pgs.
Grimes, W.R., "Molten-Salt Reactor Chemistry" Nucl. Appl. Technol. 8(137) (1970), 19 pgs.
Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, Aug. 1969.
Holcomb, et al. "Fast Spectrum Molten Salt Reactor Options", Jul. 2011, 46 pages. Available at: http://info.ornl.gov/sites/publications/files/Pub29596.pdf.
Kramer et al., Fusion-Fission Blanket Options for the LIFE Engine, Fusion Science and Technology, vol. 60, pp. 72-77, Jul. 2011.
Kramer et al., Parameter study of the LIFE engine nuclear design, Energy Conversion and Management, 51, pp. 1744-1750, 2010.
Merle-Lucotte, E., Introduction to the Physics of the Molten Salt Fast Reactor, Thorium Energy Conference 2013 (ThEC13), 2013, 82 pgs.
Molten Salt Reactor (MSR) Review: Feasibility Study of developing a pilot scale molten salt reactor in the UK, Jul. 2015, Energy Process Development, Ltd., www.energyprocessdevelopments.com, 75 pgs.
MSR-FUJI General Information, Technical Features, and Operating Characteristics., pp. 1-30.
Ottewitte, E. H., "Configuration of a Molten Chloride Fast Reactor on a Thorium Fuel Cycle to Current Nuclear Fuel Cycle Concerns," Ph.D. dissertation, University of California at Los Angeles, 1982, 310 pgs.
Ottewitte, E. H., Cursory First Look at the Molten Chloride Fast Reactor as an Alternative to the Conventional BATR Concept, 1992, 75 pgs.
PCT International Preliminary Report on Patentability in International Application PCT/US2016/055001, dated Apr. 12, 2018, 9 pages.

PCT International Preliminary Report on Patentability in International Application PCT/US2017/030666 dated Nov. 6, 2018, 9 pages.
PCT International Search Report and Written Opinion in International Application No. PCT/US2017/030672, dated Sep. 27, 2017, 9 pages.
PCT International Search Report and Written Opinion in International Application PCT/US2015/067905 dated Aug. 5, 2016, 18 pages.
PCT International Search Report and Written Opinion in International Application PCT/US2015/067923, dated Apr. 19, 2016, 10 pages.
PCT International Search Report and Written Opinion in International Application PCT/US2016/055001, dated Jan. 25, 2017, 11 pages.
PCT International Search Report and Written Opinion in International Application PCT/US2017/030666 dated Jul. 20, 2017, 11 pages.
Reactor Start-up Procedure. Technical University Dresden. Reactor Training Course. pp. 3-4. <https://tu-dresden.de/ing/maschinenwesen/iet/wket/ressourcen/dateien/akr2/Lehrrnaterialien/start_e.pdf?lang=en>. (Mar. 2015), 21 pgs.
Scott, Ian and Durham John, The Simple Molten Salt Reactor, Practical, safe and cheap, Moltex Energy LLP presentation slides, 19 pgs.
Scott, Ian, Safer, cheaper nuclear: The simple molten salt reactor (Dec. 2, 2014), http://www.ee.co.za/article/safer-cheaper-nuclear-simple-molten-salt-reactor.hlml, 10 pgs.
Taube, et al., Molten Plutonium Chlorides Fast Breeder Reactor Cooled by Molten Uranium Chloride, Annals of Nuclear Science and Engineering, vol. 1, pp. 277-281., 1974.
Thoma, R. E., "Chemical Aspects of MSRE Operations," ORNL-4658, Dec. 1971, 151 pages.
TransAtomic Power Technical White Paper, Mar. 2014, V1 .0.1., (2014), http://www.transatomicpower.com/, 34 pgs.
Van't Eind, R.J.S., Simulation of a Fast Molten Salt Reactor, PSR-131-2011-009, Jul. 2011, 68 pages.
Xu et al., Thorium Energy R&D in China, THEO13, CERN, Oct. 28, 2013, 59 pgs.
Maltsev et al., "Redox potentials of uranium in molten eutectic mixture of lithium, potassium, and cesium chlorides", Russian Metallurgy, Maiknauka-Interperidica, RU, vol. 2016, No. 8, Dec. 2016, 2 pgs.
Kuznetsov et al., "Electrochemical Behavior and Some Thermodynamic Properties of UCl [sub 4] and UCl [sub 3] Dissolved in a LiCl-KCl Eutectic Melt", Journal of the Electrochemical Society, vol. 152, No. 4, Jan. 2005, 11 pgs.
PCT International Search Report and Written Opinion in International Application PCT/US2017/046139, dated Jan. 17, 2018, 16 pages.
PCT International Preliminary Report on Patentability in International Application PCT/US2017/046139, dated Feb. 12, 2019, 8 pages.
PCT International Search Report and Written Opinion in International Application PCT/US2019/015967, dated Jun. 12, 2019, 25 pages.
PCT International Search Report and Written Opinion in International Application PCT/US2019/021791, dated Nov. 19, 2019, 15 pages.
Donnelly et al., Fabrication of Heat Exchanger Tube Bundle for the Molten-Salt Reactor Experiment, ORNL-3500 (Dec. 9, 1963).
Kimura, "Neutron spectrum in small iron pile surrounded by lead reflector", Journal of Nucear Science and Technology 15, No. 3 (1978): 183-191.
PCT International Search Report and Written Opinion in International Application PCT/US2019/051345, dated Mar. 5, 2020, 15 pages.
Wang, Jun-Wei et al., "Influence of MgC12content on corrosion behavior of GH1140 in molten NaCl—MgC12as thermal storage medium", Solar Energy Materials and Solar Cells, Elsevier Science Pub., Amsterdam, NL, vol. 179, Nov. 20, 2017, pp. 194-201.

(56) References Cited

OTHER PUBLICATIONS

PCT International Preliminary Report on Patentability in International Application PCT/US2019/015967, dated Aug. 13, 2020, 16 pages.
PCT International Preliminary Report on Patentability in International Application PCT/US2019/021791, dated Sep. 24, 2020, 9 pages.

* cited by examiner

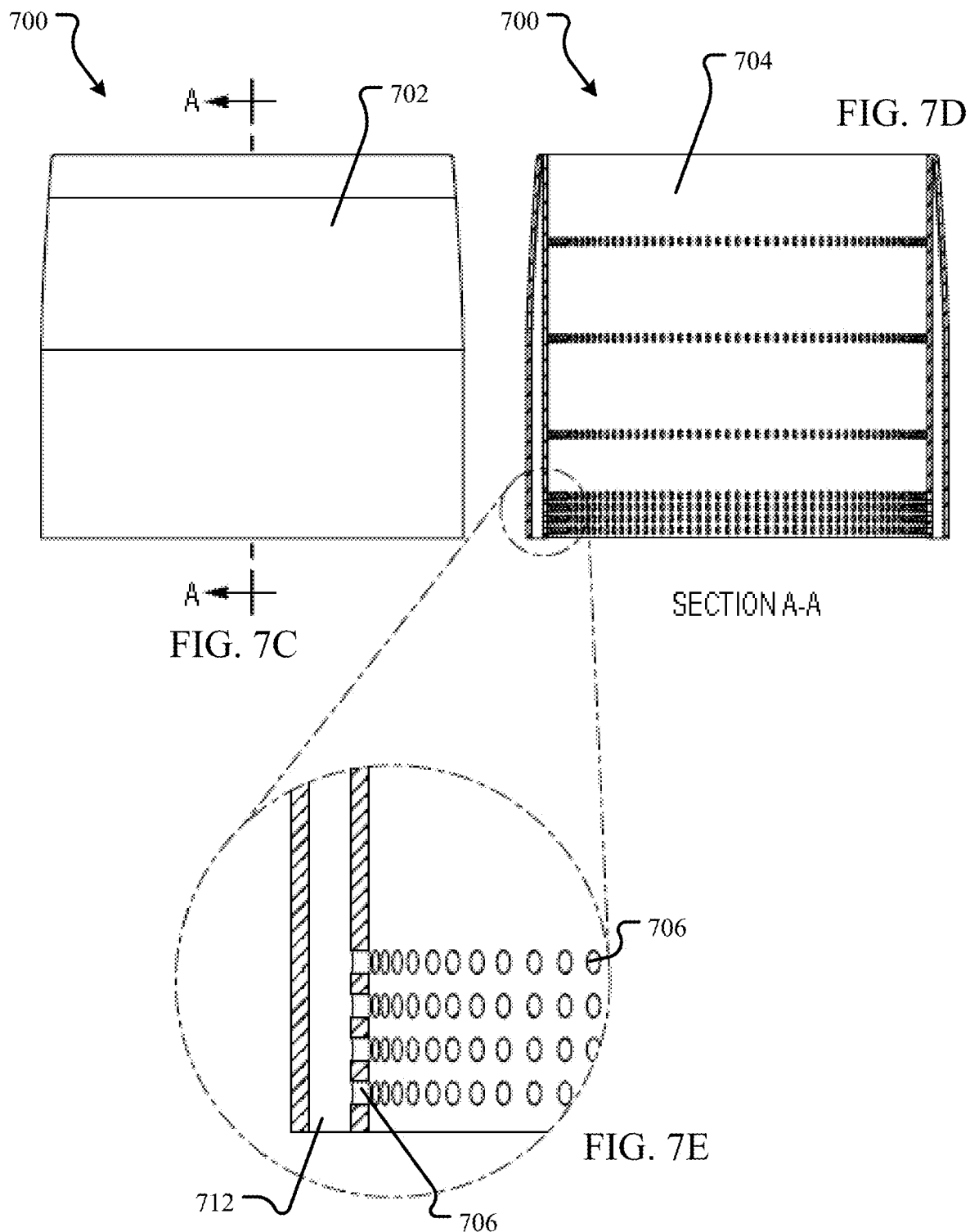

DIRECT REACTOR AUXILIARY COOLING SYSTEM FOR A MOLTEN SALT NUCLEAR REACTOR

CROSS-REFERENCE TO RELATED APPLICATIONS

The present application claims the benefit of priority to U.S. Provisional Patent Application No. 62/422,474, titled "THERMAL MANAGEMENT OF MOLTEN FUEL NUCLEAR REACTORS", filed Nov. 15, 2016, which application is hereby incorporated by reference.

INTRODUCTION

The utilization of molten fuels in a nuclear reactor to produce power provides significant advantages as compared to solid fuels. For instance, molten fuel reactors generally provide higher power densities compared to solid fuel reactors, while at the same time having reduced fuel costs due to the relatively high cost of solid fuel fabrication.

Molten fluoride fuel salts suitable for use in nuclear reactors have been developed using uranium tetrafluoride ($UF_4$) mixed with other fluoride salts as well as using fluoride salts of thorium. Molten fluoride salt reactors have been operated at average temperatures between 600° C. and 860° C. Binary, ternary, and quaternary chloride fuel salts of uranium, as well as other fissionable elements, have been described in co-assigned U.S. patent application Ser. No. 14/981,512, titled MOLTEN NUCLEAR FUEL SALTS AND RELATED SYSTEMS AND METHODS, which application is hereby incorporated herein by reference. In addition to chloride fuel salts containing one or more of $UCl_4$, $UCl_3F$, $UCl_3$, $UCl_2F_2$, and $UClF_3$, the application further discloses fuel salts with modified amounts of $^{37}Cl$, bromide fuel salts such as $UBr_3$ or $UBr_4$, thorium chloride fuel salts, and methods and systems for using the fuel salts in a molten fuel reactor. Average operating temperatures of chloride salt reactors are anticipated between 300° C. and 800° C., but could be even higher, e.g., >1000° C.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

FIGS. 7A-E illustrate an alternative embodiment of a cylindrical core barrel diffuser.

DETAILED DESCRIPTION

This disclosure describes various configurations and components of a molten fuel fast or thermal nuclear reactor. For the purposes of this application, embodiments of a molten fuel fast reactor that use a chloride fuel will be described. However, it will be understood that any type of fuel salt, now known or later developed, may be used and that the technologies described herein may be equally applicable regardless of the type of fuel used, such as, for example, salts having one or more of U, Pu, Th, or any other actinide. Note that the minimum and maximum operational temperatures of fuel within a reactor may vary depending on the fuel salt used in order to maintain the salt within the liquid phase throughout the reactor. Minimum temperatures may be as low as 300-350° C. and maximum temperatures may be as high as 1400° C. or higher.

Figure 1:
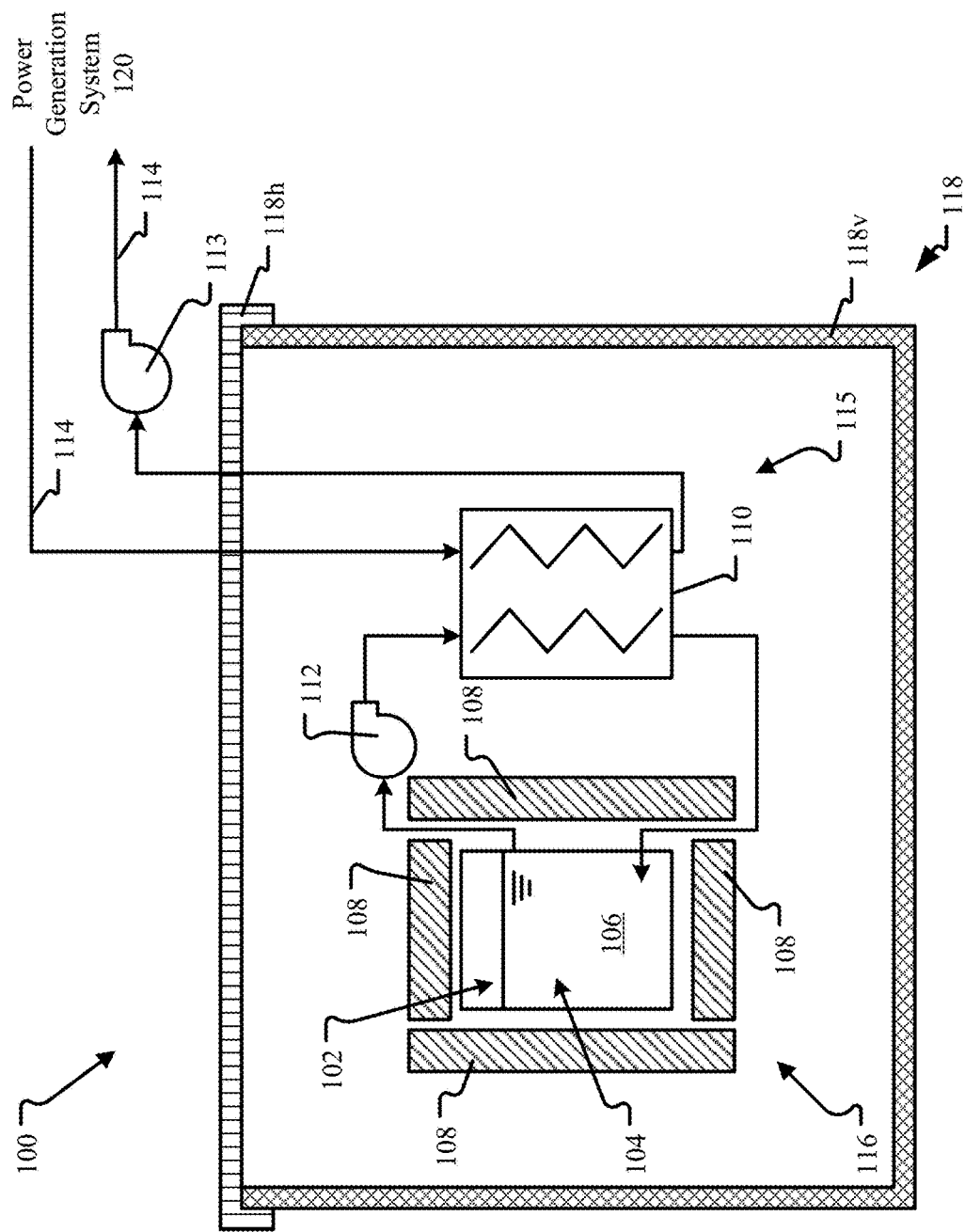
FIG. 1 illustrates, in a block diagram form, some of the basic components of a molten fuel reactor.

FIG. 1 illustrates, in a block diagram form, some of the basic components of a molten fuel reactor. In general, a molten fuel reactor 100 includes a reactor core 104 containing a fissionable fuel salt 106 that is liquid at the operating temperature. Fissionable fuel salts include salts of any nuclide capable of undergoing fission when exposed to low-energy thermal neutrons or high-energy neutrons. Furthermore, for the purposes of this disclosure, fissionable material includes any fissile material, any fertile material or combination of fissile and fertile materials. The fuel salt 106 may or may not completely fill the core 104, and the embodiment shown is illustrated with an optional headspace 102 above the level of the fuel salt 106 in the core 104. The size of the reactor core 104 may be selected based on the characteristics and type of the particular fuel salt 106 being used in order to achieve and maintain the fuel in an ongoing state of criticality, during which the heat generated by the ongoing production of neutrons in the fuel causes the temperature of the molten fuel to rise when it is in the reactor core. The performance of the reactor 100 is improved by providing one or more reflectors 108 around the core 104 to reflect neutrons back into the core. The molten fuel salt 106 is circulated between the reactor core 104 and one or more primary heat exchangers 110 located outside of the core 104. The circulation may be performed using one or more pumps 112.

The primary heat exchangers 110 transfer heat from the molten fuel salt 106 to a primary coolant 114 that is circulated through a primary coolant loop 115. In an embodiment the primary coolant may be another salt, such as $NaCl$—$MgCl_2$, or lead. Other coolants are also possible including Na, NaK, supercritical $CO_2$ and lead bismuth eutectic. In an embodiment, a reflector 108 is between each primary heat exchanger 110 and the reactor core 104 as shown in FIG. 1. For example, in an embodiment a cylindrical reactor core 104, having a diameter of 2 meters (m) and a height of 3 m, is oriented vertically so that the flat ends of the cylinder are on the top and bottom respectively. The entire reactor core 104 is surrounded by reflectors 108 between which are provided channels for the flow of fuel salt 106 into and out of the reactor core 104. Eight primary heat exchangers 110 are distributed azimuthally around the circumference of the reactor core and reflector assembly, each provided with pumps to drive circulation of the fuel salt. In alternative embodiments, a different number of primary heat exchangers 110 may be used. For example, embodiments having 2, 3, 4, 5, 6, 12, and 16 primary heat exchangers are contemplated.

In the embodiment shown in FIG. 1, in normal (power generating) operation the fuel salt is pumped from the reactor core 104, through the heat exchanger 110 and cooled fuel salt is returned back to reactor core 104. Heated primary coolant 114 from the primary heat exchangers 110 is passed to a power generation system 120 for the generation of some form of power, e.g., thermal, electrical or mechanical. The reactor core 104, primary heat exchangers 110, pumps 112, molten fuel circulation piping (including other ancillary components that are not shown such as check valves, shutoff valves, flanges, drain tanks, etc.) and any other components through which the molten fuel circulates or contacts during operation can be referred to as the fuel loop 116. Likewise, the primary coolant loop 115 includes those components through which primary coolant circulates, including the primary heat exchangers 110, primary coolant circulation piping (including other ancillary components that are not shown such as coolant pumps 113, check valves, shutoff valves, isolation valves, flanges, drain tanks, etc.).

Salt-facing elements of the heat exchanger 110 and the primary coolant loop 115 may be clad to protect against corrosion. Other protection options include protective coatings, loose fitting liners or press-fit liners. In an embodiment, cladding on the internal surface of the tubes is molybdenum that is co-extruded with the base heat exchanger tube material. For other fuel salt contacting surfaces (exterior surfaces of the tube sheets and exterior surface of the shell), the cladding material is molybdenum alloy. Nickel and nickel alloys are other possible cladding materials. Niobium, niobium alloys, and molybdenum-rhenium alloys may be used where welding is required. Components in contact with primary cooling salt may be clad with Alloy 200 or any other compatible metals, such as materials meeting the American Society of Mechanical Engineers' pressure vessel code. The tube primary material may be 316 stainless steel or any other compatible metals. For example, in an embodiment alloy 617 is the shell and tube sheet material.

The molten fuel reactor 100 further includes at least one containment vessel 118 that contains the fuel loop 116 to prevent a release of molten fuel salt 106 in case there is a leak from one of the fuel loop components. The containment vessel 118 is often made of two components: a lower, vessel portion 118$v$ that takes the form of a unitary, open-topped vessel with no penetrations of any kind; and a cap 118$h$ referred to as the vessel head that covers the top of the vessel portion 118$v$. All points of access to the reactor 100 are from the top through the vessel head 118$h$.

One possible situation faced by reactors is a loss of forced flow event in which, possibly due to a power failure or some other cause, the salt pumps cease to function. In such an event, the reactor must still be cooled to prevent an unacceptable temperature increase even after the protection system shuts down the fission chain reaction because fission products in the fuel salt will produce decay heat. Reactors are often provided with a direct reactor auxiliary cooling system (DRACS) specifically to limit this temperature increase before there is damage to any of the components. A DRACS is an auxiliary cooling system, which may or may not be completely independent of the primary coolant loop, which is designed to provide auxiliary cooling in certain circumstances, such as to remove decay heat from the fuel salt during a loss of forced flow event or other events.

In some cases, a DRACS relies on the natural circulation of the fuel salt through the fuel loop 116. In many fuel salts, higher temperature molten salt is less dense than lower temperature salt. For example, in one fuel salt (71 mol % $UCl_4$-17 mol % $UCl_3$-12 mol % NaCl) for a 300° C. temperature rise (e.g., 627° C. to 927° C.), the fuel salt density was calculated to fall by about 18%, from 3680 to 3010 kg/m$^3$. The density differential created by the temperature difference between the higher temperature salt in the core and the lower temperature salt elsewhere in the fuel loop 116 creates a circulation cell in the fuel loop. This circulation is referred to as natural circulation.

Broadly speaking, this disclosure describes multiple alterations and component configurations that improve the performance of the reactor 100 described with reference to FIG. 1.

DRACS Decay Heat Heat Exchanger (DHHX)

Figure 2A:
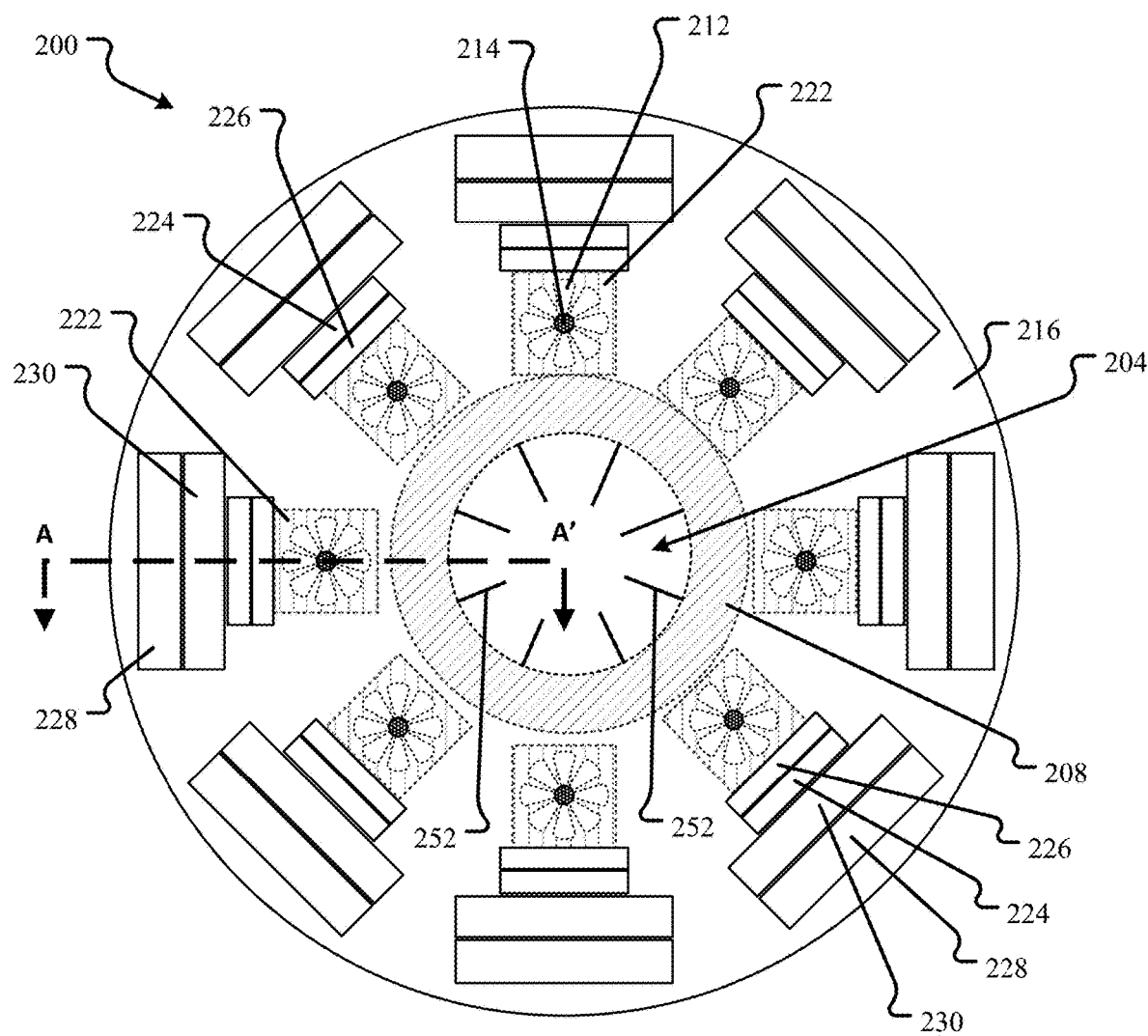
FIGS. 2A and 2B illustrate a molten fuel reactor equipped with DRACS heat exchangers.
Figure 2B:
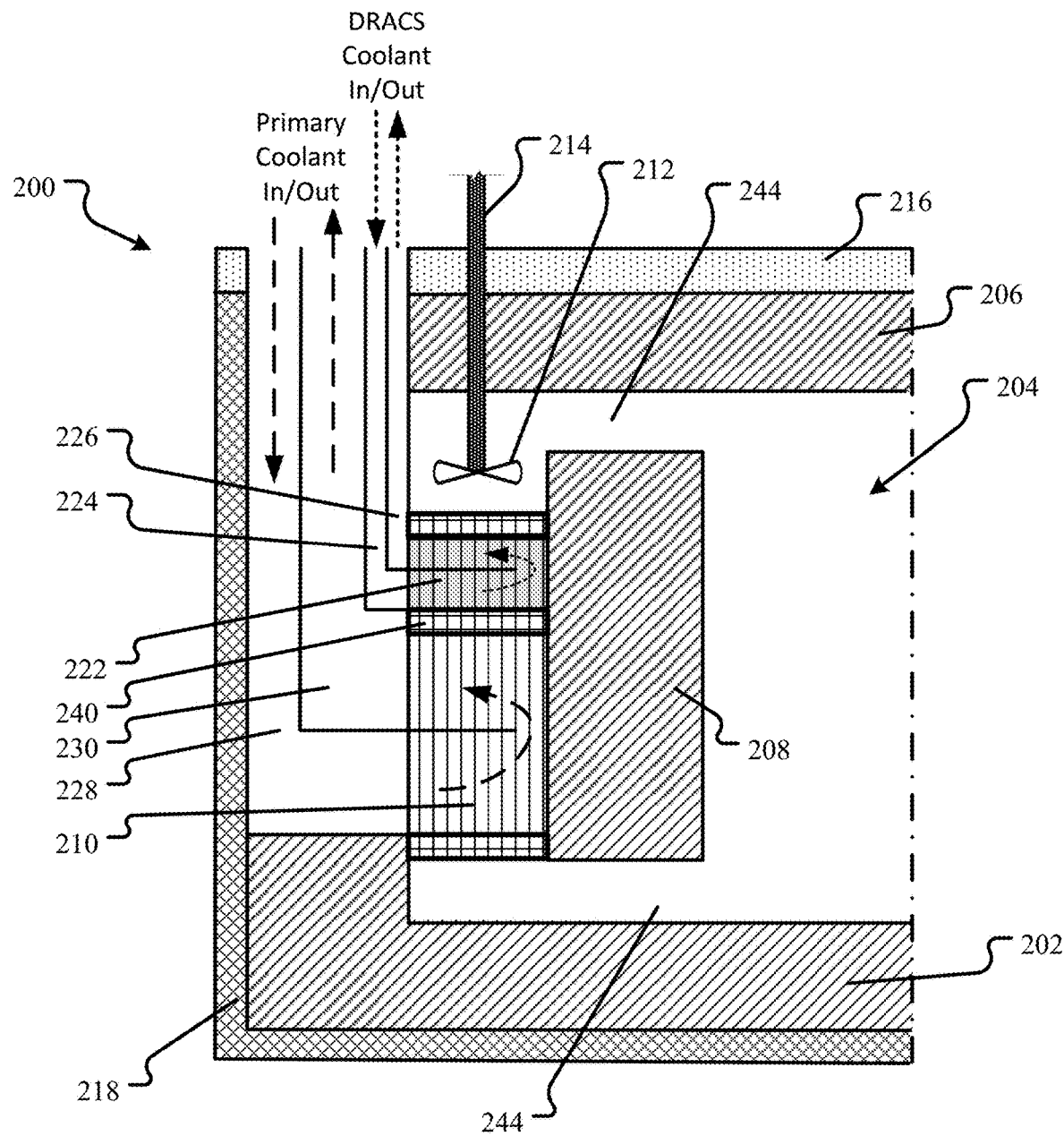

FIGS. 2A and 2B illustrate a molten fuel reactor equipped with DRACS heat exchangers dedicated to the removal of decay heat during a reactor shutdown event. A reactor shutdown event may be a planned reactor shutdown, an unplanned loss of forced flow in the fuel salt loop, or some other event that requires the uses of the DRACS to remove heat from the reactor core. FIG. 2A is a plan view of a reactor 200 illustrating the locations of various ducts and components penetrating and below the reactor head 216. FIG. 2B is a sectional view of the reactor 200 taken along section line A-A' of FIG. 2A. Similar to that described with reference to FIG. 1, the reactor 200 includes a reactor core in the form of a defined volume 204 filled with fuel salt. The reactor core 204 is defined by a cylindrical reflector 208, an upper reflector 206 and a lower reflector 202, with passages provided between the reflectors 208, 206, 202 to allow salt to circulate into and out of the reactor core 204.

In the embodiment shown, eight heat exchanger circuits, each including a DRACS heat exchanger 222 and a primary heat exchanger (PHX) 210, are spaced around the reactor core 204. Fuel salt transfer ducts 244 are provided at the top 244$a$ and the bottom 244$b$ of the reactor core 204 that provide a flow path between the upper 204$a$ and lower 204$b$ regions of core, respectively, and each of the eight heat exchanger circuits. The reactor core 204, reflectors 208, 206, 202, and heat exchanger circuits are within an open-topped containment vessel 218 that is capped with a vessel head 216. Forced flow of the fuel salt is driven by eight impellers 212, each impeller 212 driven by a shaft 214 that penetrates the vessel head 216.

The DRACS heat exchangers 222 are referred to as Decay Heat Heat Exchangers (DHHXs) to differentiate them from the primary heat exchangers 210. In the embodiment shown, the DHHXs 222 and PHXs 210 are shell and tube exchangers in which multiple tubes 211 (referred to as the tubeset or tube bundle) pass through a shell 213 filled with coolant (this configuration is sometimes referred to as a shell-side coolant/tube-side fuel configuration). Fuel salt flows through the tubeset and is cooled by the coolant. In the embodiment shown, each DHHX 222 is located vertically above an associated PHX 210. The internal coolant volume of the shell of the DHHX 222 and the shell of the PHX 210 are separated by a tube sheet 240 through which a continuous set of vertical tubes (a tubeset) passes. In the embodiment shown, the fuel flows through the tubes of the tubeset.

Coolant is flowed through the shell around the tubes of the tubeset. Tube sheets 240 are also provided at the inlet and outlet of the heat exchanger circuits.

In the embodiment shown in FIG. 2A, the DHHX coolant and the PHX coolant are provided by independent coolant circuits. In the embodiment shown, the primary coolant circuit delivers the primary coolant to the bottom of each of the PHX's shells via an inlet duct 228 and a return duct 230 removes the heated primary coolant from the top of each PHX's shell. DRACS coolant is delivered by a DRACs coolant inlet duct 224 through the vessel head 216, into the DHHX shell and then removed, again through the vessel head, by a DRACS coolant return duct 226.

Alternative embodiments are also possible. For example, the DHHXs and PHXs in a heat exchanger circuit may be different types of heat exchangers. For example, in addition to shell and tube heat exchangers, plate (sometimes also called plate-and-frame), plate and shell, printed circuit, and plate fin heat exchangers may be suitable. Alternatively or additionally, the relative locations of the DHHXs and PHXs to each other may be varied. For example, a DHHX may be located next to or below its associated PHX. In yet another embodiment, not all of the salt passing through the PHX may also pass through its associated DHHX.

Likewise, the location of the coolant inlet and return ducts may be varied. For example, the DRACs coolant inlet and return ducts 224, 226 and/or the PHX coolant and return ducts 228, 230 may be located between the DHHX 222 and the cylindrical reflector 208, or any other location relative to their associated heat exchangers, rather than between the heat exchangers and the containment vessel 218 as shown.

The primary coolant and the DRACS coolant may be the same composition or may be different. In an embodiment the primary and/or DRACS coolant may be another salt, such as $NaCl-MgCl_2$, or lead. Other coolants are also possible including Na, NaK, supercritical $CO_2$ and lead bismuth eutectic.

During normal, power-generating operation, the DRACS may or may not be cooling the fuel salt. In one embodiment, for example, the DHHXs do not provide any cooling during normal operation so that all of the heat removed from the fuel salt is removed by the PHXs. In this embodiment, DRACS coolant in the DHHX is allowed to heat up to the operating temperature. The heated DRACS coolant may be periodically or continuously circulated, such as through the DHHX or the DRACS coolant loop, to prevent fouling. In an alternative embodiment, the DRACS is continuously operated and the heat removed by the DRACS coolant may or may not be recovered for power generation or general heating.

Fuel Mixing Devices

Figure 2C:
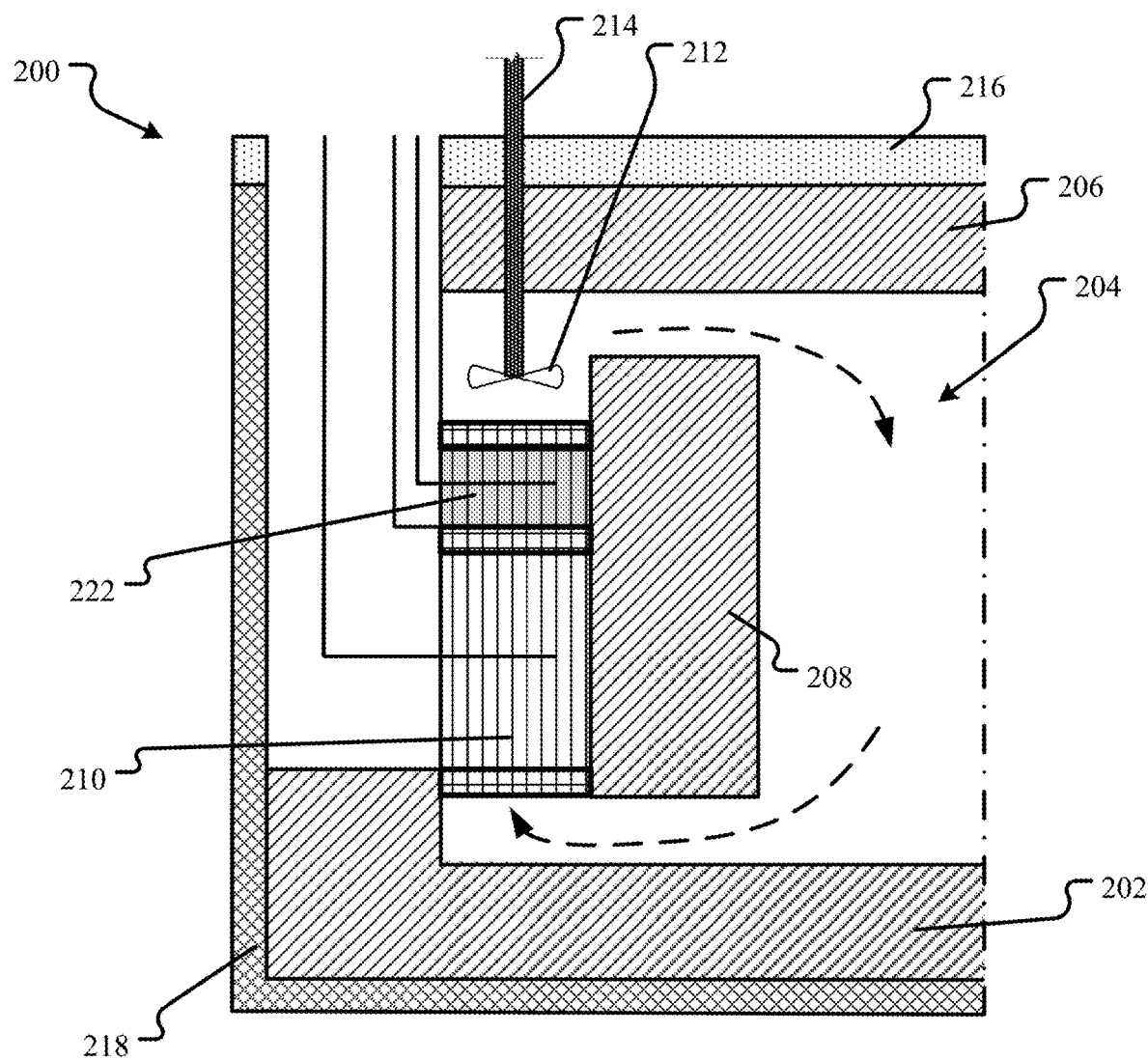
FIGS. 2C and 2D illustrate a method of operating the same molten fuel reactor shown in FIGS. 2A and 2B that reduces the corrosion of the impellers while maintaining the impellers near the top of the reactor core.
Figure 2D:
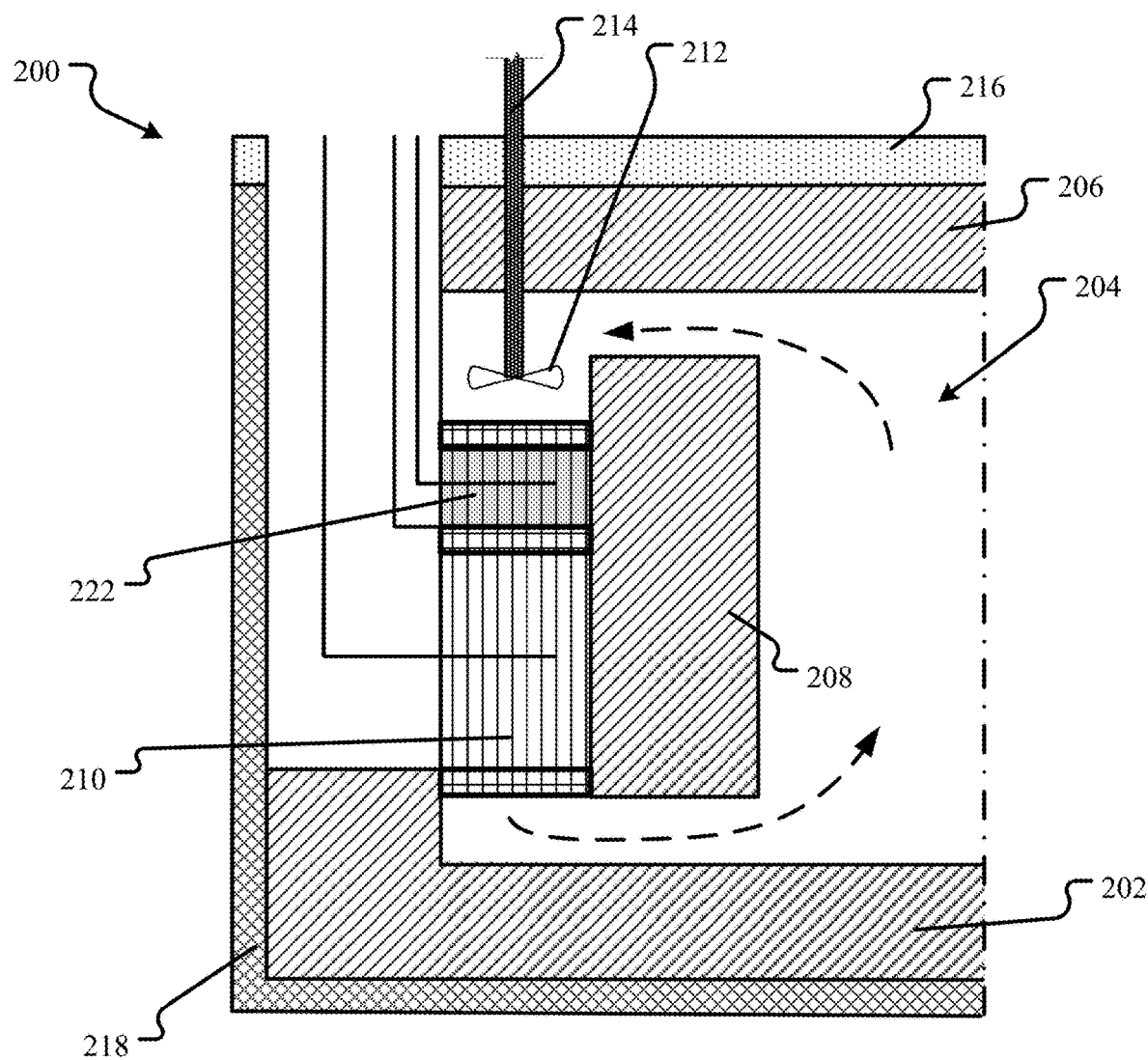
Figure 2E:
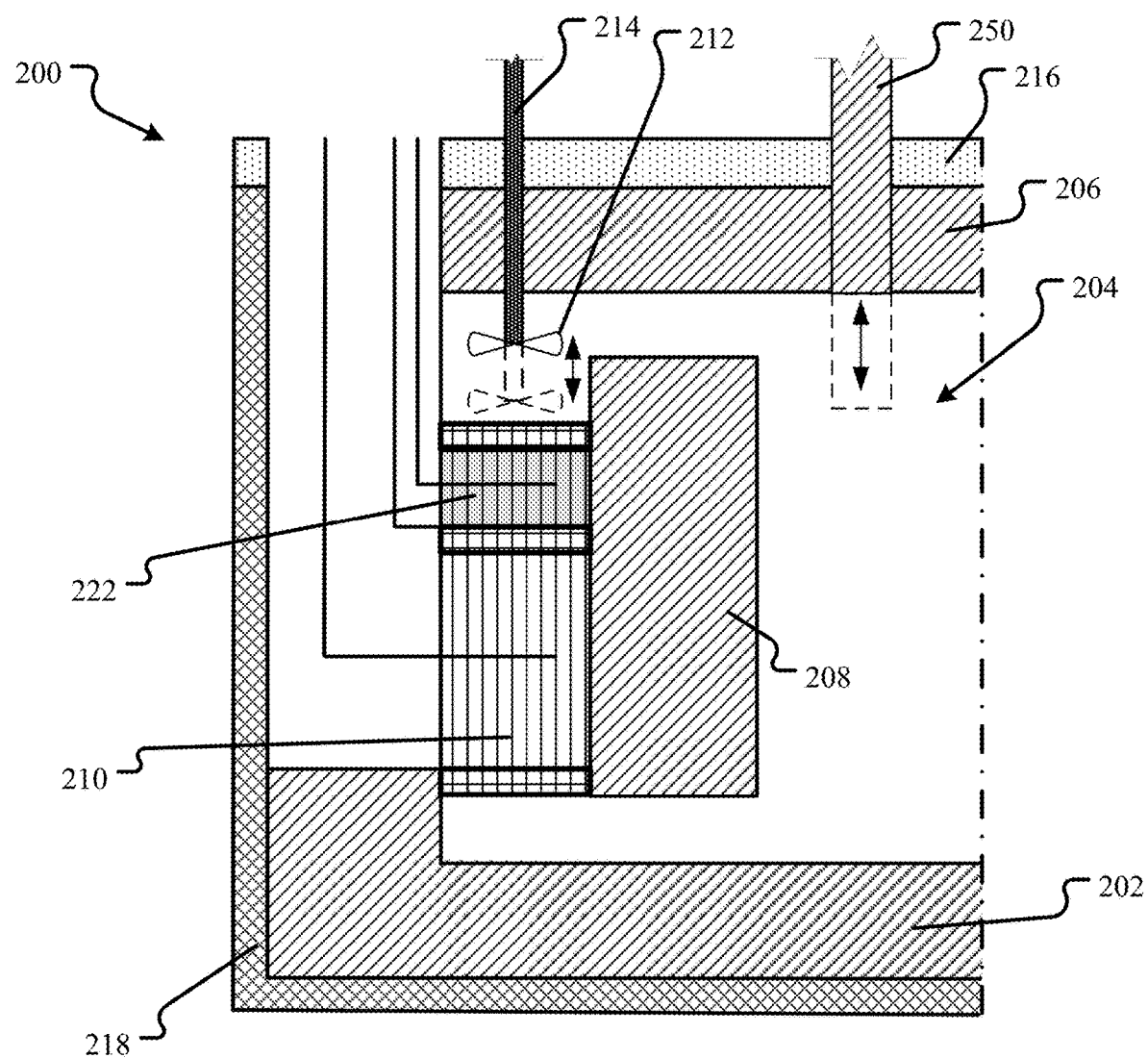
FIG. 2E illustrates two embodiments of a fuel displacement device.
Figure 2F:
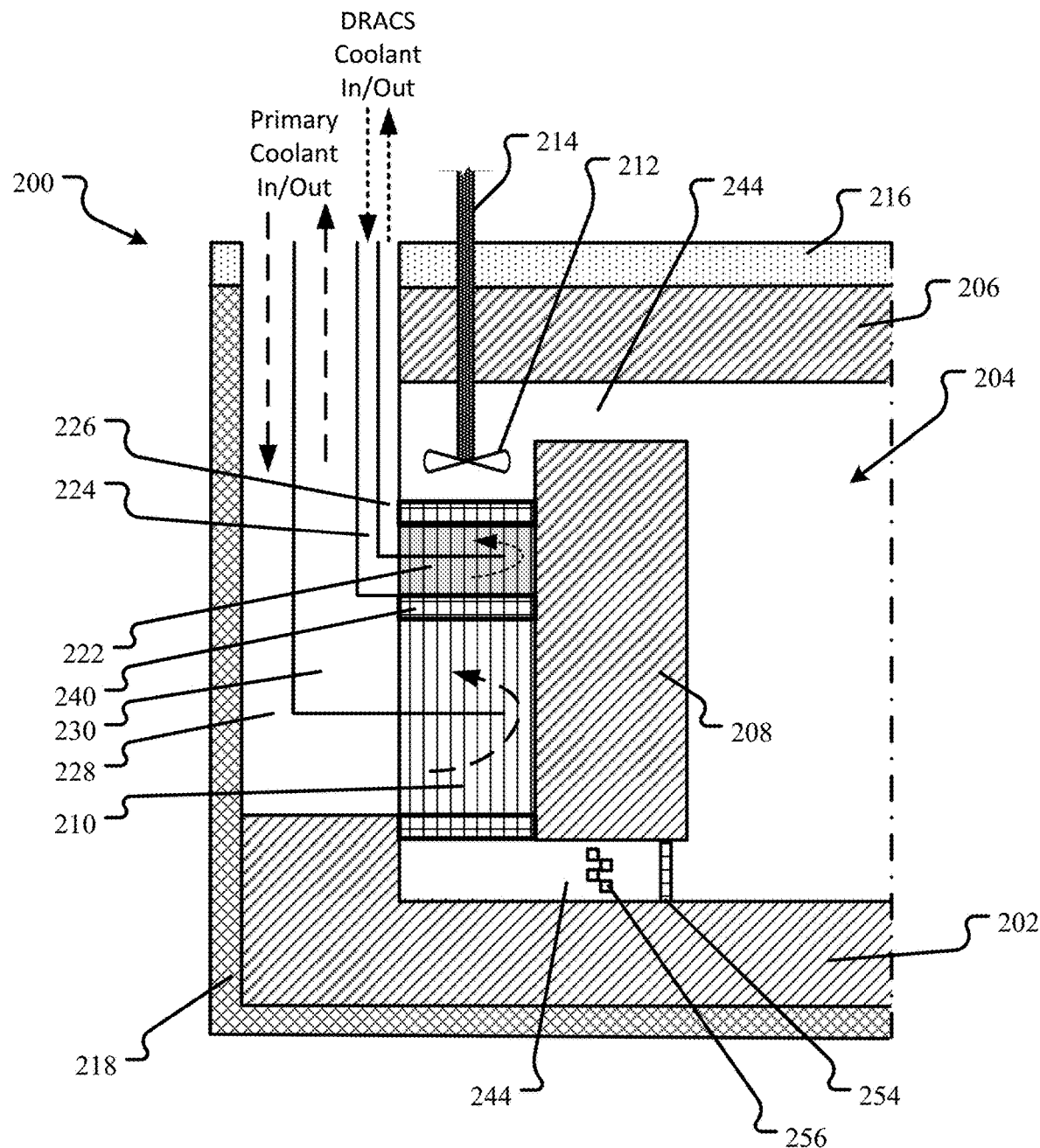
FIG. 2F illustrates another aspect of the technology in which fuel salt exiting the heat exchangers is mixed by one or more passive mixing devices.

FIG. 2F illustrates another aspect of the technology in which fuel salt exiting the heat exchangers is mixed by one or more passive mixing devices. This may be done using any kind of baffles, contours and/or other equipment that provides mixing to the fuel salt to prevent hot and cold zones from developing within the fuel salt transfer ducts 244. In the embodiment shown, a set of static mixing vanes 256 is illustrated in the lower fuel salt transfer duct 244. The mixing vanes 256 are shaped to enhance the mixing of the fuel salt as it flows around the vanes.

Another mixing device in the form an orifice plate 254 is also illustrated. In an embodiment, the orifice plate 254 is a simple perforated plate provided with a number of circular holes through which the fuel salt flows. The turbulence created by the flow through the plate 254 enhances mixing and homogenizes the temperature of the fuel salt. In another embodiment, the perforations in the orifice plate 254 may be shaped, angled, or otherwise aligned to direct the flow in order to enhance the mixing even more.

Figure 2G:
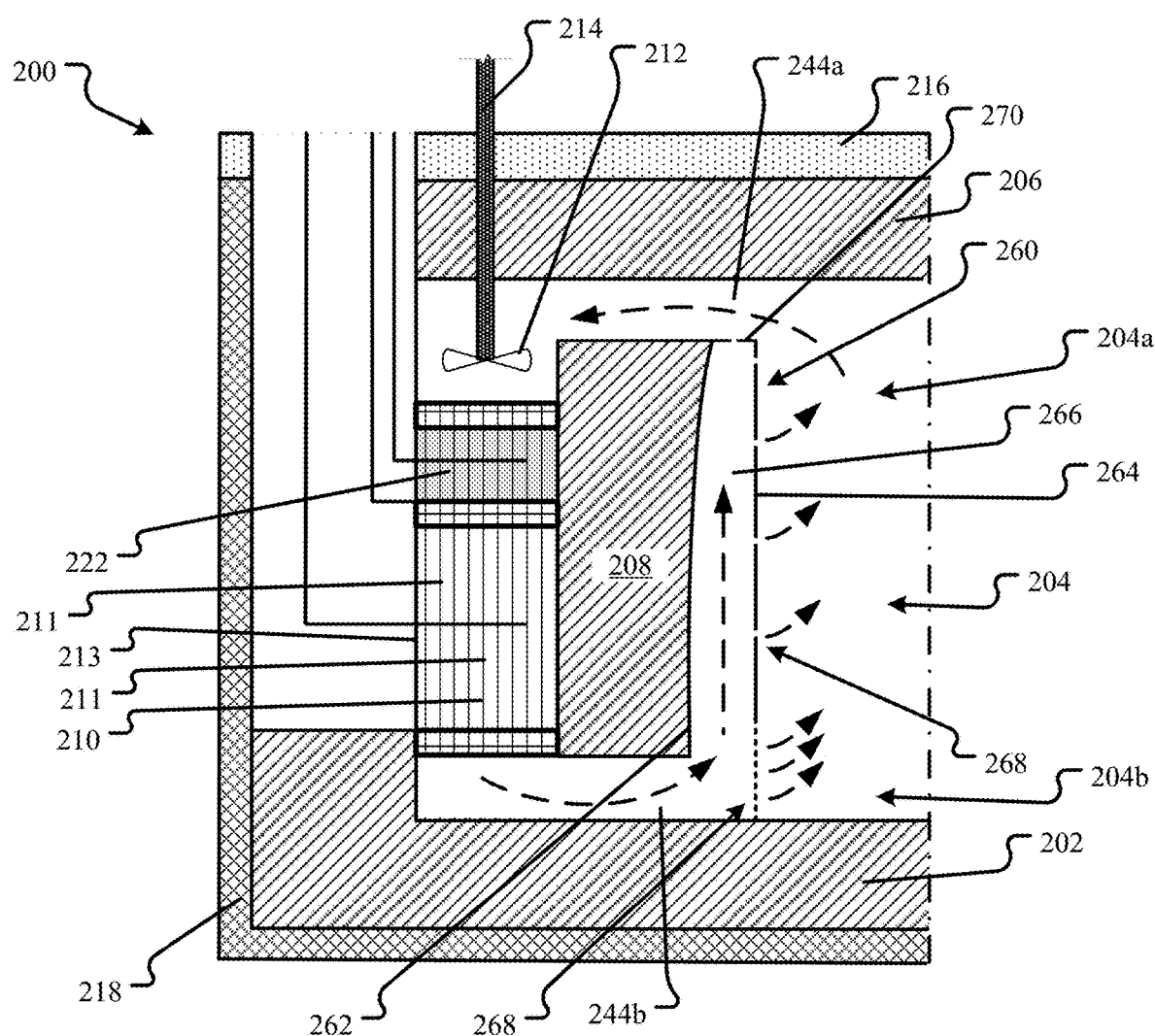
FIG. 2G illustrates yet another embodiment in which fuel salt exiting the heat exchangers is mixed by a diffuser component.

FIG. 2G illustrates another embodiment in which fuel salt exiting the heat exchangers is mixed by a passive mixing device, in this case a vertical diffuser that causes the cooled fuel salt to be delivered into the reactor core at different vertical locations around the periphery of the reactor core. In this embodiment, the fuel salt exiting the PHXs 210 is routed into a core barrel diffuser 260. The core barrel diffuser 260 is defined by an exterior cylindrical wall 262 adjacent to or in contact with the side reflector 208 and an interior cylindrical wall 264 that defines the periphery of the reactor core 204. The exterior wall 262 and the interior wall 264 are separated by a space which forms a cylindrical plenum 266 through which the cooled fuel salt passes before entering the reactor core proper 204. In the embodiment shown, the exterior wall 262 and the interior wall 264 are connect at the top by a top wall 270. Cooled fuel salt from the PHX 210 outlet flows into the core barrel diffuser 260. In the embodiment shown the cooled fuel salt flows into the bottom of the core barrel diffuser 260 through an opening in the exterior wall 262 provided for each PHX 210. The interior wall 264 is provided with perforations 268 at different locations to control the flow of the cooled fuel salt into the reactor core 204. In the embodiment shown, perforations are spaced vertically at different levels along the interior wall 264 from the bottom to near the top of the core barrel 260 although a relatively larger number of perforations are provided at the bottom of the reactor core 204.

This core barrel 260 design results in relatively cooler fuel salt being adjacent to the side reflector 208, essentially forming a cooled fuel salt layer around the outside of the reactor core. This allows greater flexibility in the choice of reflector materials and reflector design. In fact, one or more perforations may be provided from the core barrel 260 into the fuel salt inlet duct 244, thereby cooling the upper surface of the side reflector 208 as well. FIGS. 7A-E, below, illustrate an alternative embodiment of a cylindrical core barrel diffuser in greater detail.

In the cylindrical core barrel diffusers of FIG. 2G and FIGS. 7A-E, the plenum 266 is a continuous space around the reactor core 204 that collects all the cooled fuel salt before it flows into the reactor core 204. However, a cylindrical core barrel diffuser 260 is but one possible geometry of a diffuser that directs the flow of cooled fuel salt into the reactor core at different vertical levels around the exterior of the core. In an alternative embodiment, an individual diffuser for each PHX 210 is provided that is simply a plenum roughly in the shape of a vertically oriented rectangular prism or cylinder section that extends from the bottom of the reactor core 204 to the inlet duct of the PHX 210 or even the top of the reactor core 204. Provided with perforations 268 vertically along the interior wall 264, the individual diffusers will differ from the cylindrical core barrel diffuser 260 in that the cooled fuel salt from each PHX 210 is not collected in and passed through a single plenum, but rather the individual output streams of cooled fuel salt maintained separate until collected in the reactor core 204.

Figures 7A, 7B:
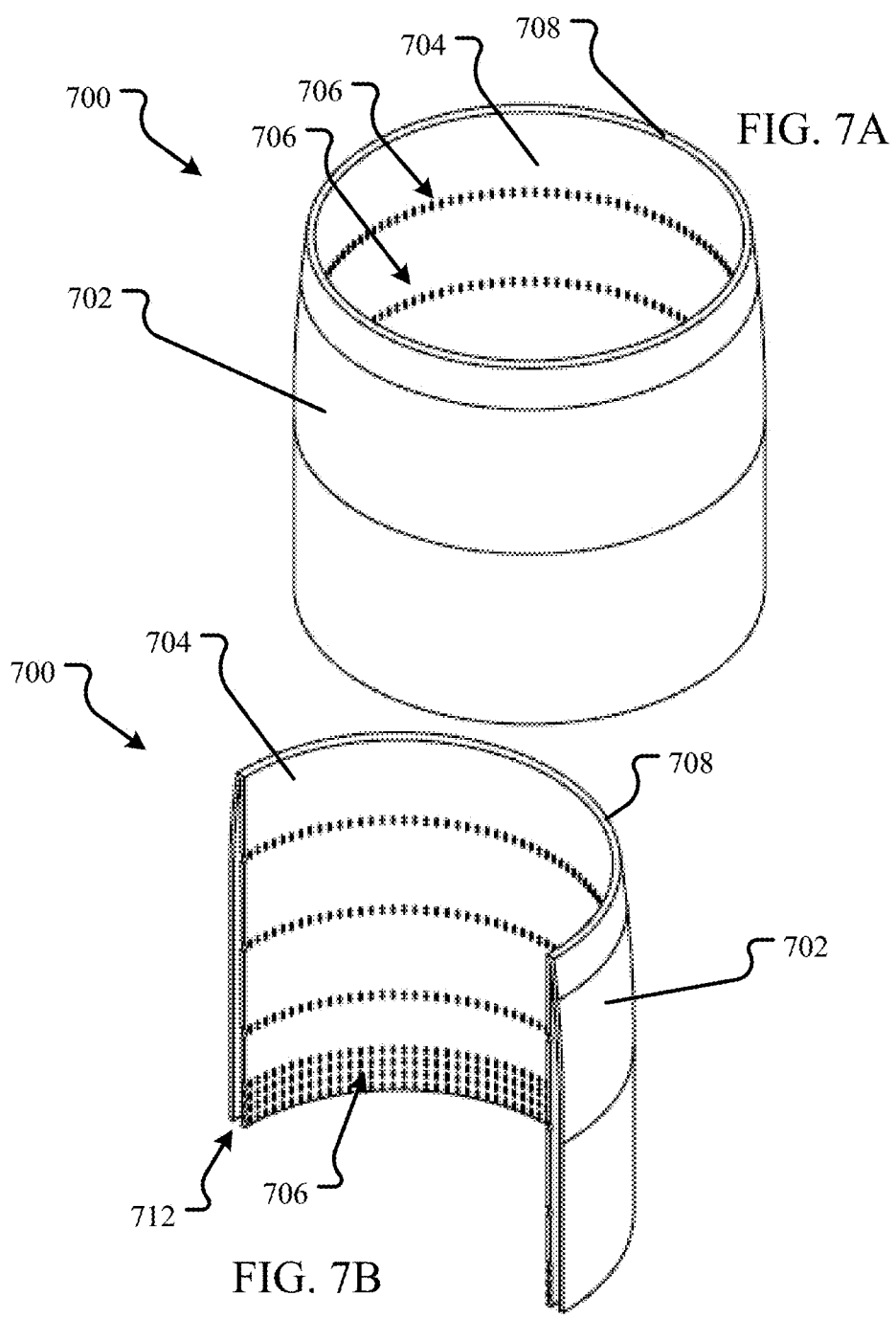

FIGS. 7A-E illustrate an alternative embodiment of a cylindrical core barrel diffuser in greater detail. FIG. 7A illustrates a perspective view of a core barrel diffuser 700. In the embodiment shown, the core barrel diffuser 700 includes an exterior wall 702 and an interior wall 704 in which the interior wall 704 is provided with perforations 706. The exterior wall 702 is illustrated as tapering inwardly near the top of the diffuser 700 and the two walls 702, 704 are connected by a top wall 708.

FIG. 7B is a perspective cross-sectional view of the core barrel diffuser 700 showing more detail of the interior wall 704 and perforations 706. In the embodiment shown, the perforations are provided in rows arranged around the interior wall 704 at different levels within the diffuser 700. Relatively more perforations 706 are provided near the bottom of the diffuser 700, as shown. The perforations provide access to a space 712 between the interior wall 704 and the exterior wall 702 that acts as a plenum 712 for the transport of fuel salt from the bottom of the diffuser 700 into the reactor core.

FIG. 7C is a plan view from the side of the diffuser and FIG. 7D is a cross-sectional plan view, again showing more detail of the interior wall 704, rows of perforations 706, the plenum 712 and the taper of the exterior wall 702. FIG. 7D also illustrates the flow path of cooled fuel salt entering the reactor core through the rows of perforations 706. The molten fuel salt enters the plenum 712 from below under pressure and flows through the perforations 706 into the reactor core.

FIG. 7E is a detail view from the cross-sectional plan view of FIG. 7D of the base of the diffuser 700 showing the plenum 712 and rows of perforations 706 at the base of the interior wall 704.

In the embodiment shown, the perforations are simple horizontally-aligned cylindrical holes in the interior wall 704. In an alternative embodiment, the perforations may be diagonally aligned, for example at a 45 degree angle (up or down), to direct the flow of the fuel salt entering the reactor core up or down depending on the desired flow pattern. In yet another embodiment, the perforations may be frusto-conical in shape causing them to act as simple nozzles to passively control the velocity of the flow into the reactor core. In yet another embodiment, a nozzle having a more complex flow path may be installed in each perforation. The perforations or nozzles may all be identically sized and/or oriented or may be differently sized and/or oriented to achieve more complex salt circulation patterns within the reactor core during operation.

In the embodiment shown, the exterior wall 702 is provided with an inward taper achieved by two conical sections before the exterior wall 702 and the interior wall 704 meet the top wall 710. The exterior wall is illustrated as roughly of uniform thickness so that the taper is then also provided to the plenum 712. The tapered shape of the plenum 712 is used to control the flow profile of the cooled fuel salt through the plenum 712. In an alternative embodiment, the taper could be achieved using more or less conical sections or one or more give curves. In yet another embodiment, the exterior wall 704 is not uniform in thickness, however a tapering plenum 712 is still provided. For example, the exterior surface of the exterior wall 704 may not be provided with a taper, but the thickness of the wall 702 increases near the top of the reactor core to maintain a tapered profile of the plenum 712 as described above.

In the diffuser embodiment shown, the diffuser 700 is cylindrical in configuration. Other configurations are possible including any regular or irregular prism such as an octagonal prism, hexagonal prism, rectangular prism, or cube shape.

Fuel Displacement Devices

Control of the level of fuel salt within the reactor can be helpful in the efficient operation of a molten fuel salt reactor. As mentioned above with reference with FIG. 1, the fuel salt 106 in a reactor may or may not completely fill the core, and the embodiment shown is illustrated with an optional headspace 102 above the level of the fuel salt 106 in the core 104. In an embodiment, a reactor may be provided with one or more fuel displacement devices to control the fuel salt level during operation. A fuel displacement device is a component that can be used to change the total volume of the fuel loop 116 by either moving the component into or out of the fuel loop 116 or by changing the size of a component that is already in the fuel loop.

FIG. 2E illustrates two examples of a fuel displacement device. One example of a simple fuel displacement device is a displacing rod 250, which could be made of reflecting or absorbing material, that extends through the vessel head 216 into the reactor core 204, thereby displacing fuel in the core. FIG. 2E illustrates such a rod 250 that can be moved between a first position in which the rod is flush with the top reflector 206 and a second position, illustrated by the dashed lines in which the rod 250 has penetrated into the reactor core 204. Such a displacement rod need not penetrate the reactor head 216 as shown, but rather could be built into the top reflector 206. The displacement rod 250 could be as large as needed. Indeed, in an embodiment the entire top reflector 206 may be moveable to act as the displacement device. The second example shown uses the shaft 214 as the displacement device. In this embodiment, the position of the impeller 212 could be raised or lowered, thereby changing the amount of volume in the fuel loop taken up the shaft 214. A displacement device could be located anywhere within the reactor. For example, the rod 250 could come out of the lower reflector 202 or the cylindrical reflector 208. In addition, the displacement rod 250 need not go into the reactor core 204, but could displace fuel from any location in the fuel loop.

In an alternative embodiment, a displacement device could take the form of a component that is already within the reactor 200 but that could change its shape or otherwise be controlled so that the volume of the fuel loop is altered. For example, a metal bellows containing primary or DRACS coolant could be provided in the fuel loop such as above or below the heat exchanger circuits. The size of the bellows could be controlled by injecting or removing the coolant. In yet another embodiment, the bellows could be filled with an inert gas and the size controlled by injecting or removing the gas.

Displacement of the fuel could be used for reactivity control, thus allowing the reactivity to be adjusted through movements of a displacement device. This could be achieved through the changing of the shape of the reactor core volume. Further reactivity control could be provided by including moderating material in the displacement device. In an embodiment a displacement device is also a control rod made, at least in part, of moderating material. For example, such a device could be a moderating material such as boron (e.g., $B_4C$), silver, indium or cadmium contained with a protective sleeve or cladding, as described above, to prevent contact of the moderating material with the fuel salt.

Another example of fuel displacement devices are displacing vanes 252 as shown in FIG. 2A. In this embodiment, one or more vanes 252 are provided in the fuel loop, such as in the reactor core 204 as shown. The vanes 252 may be made of reflecting or absorbing material and may have a cladding or sleeve for protection from contact with the salt. The vanes may extend through the vessel head 216 into the reactor core 204. The vanes 252 may be moveable so that they can be raised or lowered thereby displacing fuel in the core. In an embodiment, vanes can be completely removed from the core 204. One aspect of the displacing vanes 252 different from simple rods 250 is that the vanes 252 also serve to stabilize and direct the flow of salt through the reactor core 204.

Reversed Fuel Flow

In molten fuel reactors, pump impellers are one component that has to operate in a particularly hostile environment. In order to take advantage of the natural circulation force, fuel salt reactors remove hot fuel salt from the top of the reactor core, transfer heat from the salt, and then return the cooled salt to the bottom of the reactor core. In a reactor design in which pump impellers are driven by a shaft that enters through the top of the vessel head, it is desirable to locate the impellers near the top of the reactor. However, fuel salt is often very corrosive and the corrosivity often increases with fuel salt temperature. The top placement of the impellers, then, exposes the impellers to the highest temperature fuel salt in the fuel loop 116 which occurs at the point of exit of the fuel salt from the reactor core, thus increasing the corrosion to the impellers.

FIGS. 2C and 2D illustrate a method of operating the same molten fuel reactor shown in FIGS. 2A and 2B that reduces the corrosion of the impellers 212 while maintaining the impellers near the top of the reactor core 204. In the embodiment shown, the corrosion reduction is achieved by reversing the flow of salt in the fuel loop during normal, power-generating operation (the flow is reversed relative to the flow of salt due to natural circulation). That is, by reversing the flow of fuel salt during normal, power-generating operation so that cooled salt enters the top of the reactor core 204 and hot salt exits the bottom of the reactor core 204, the top-mounted impellers 212 are exposed to the coolest temperature salt in the fuel loop at the outlet of the heat exchangers 210, 222. The lower temperature operating environment decreases the cost of materials needed for the impellers while maintaining the top-mounted location and may also improve the pumping efficiency.

Figure 4:
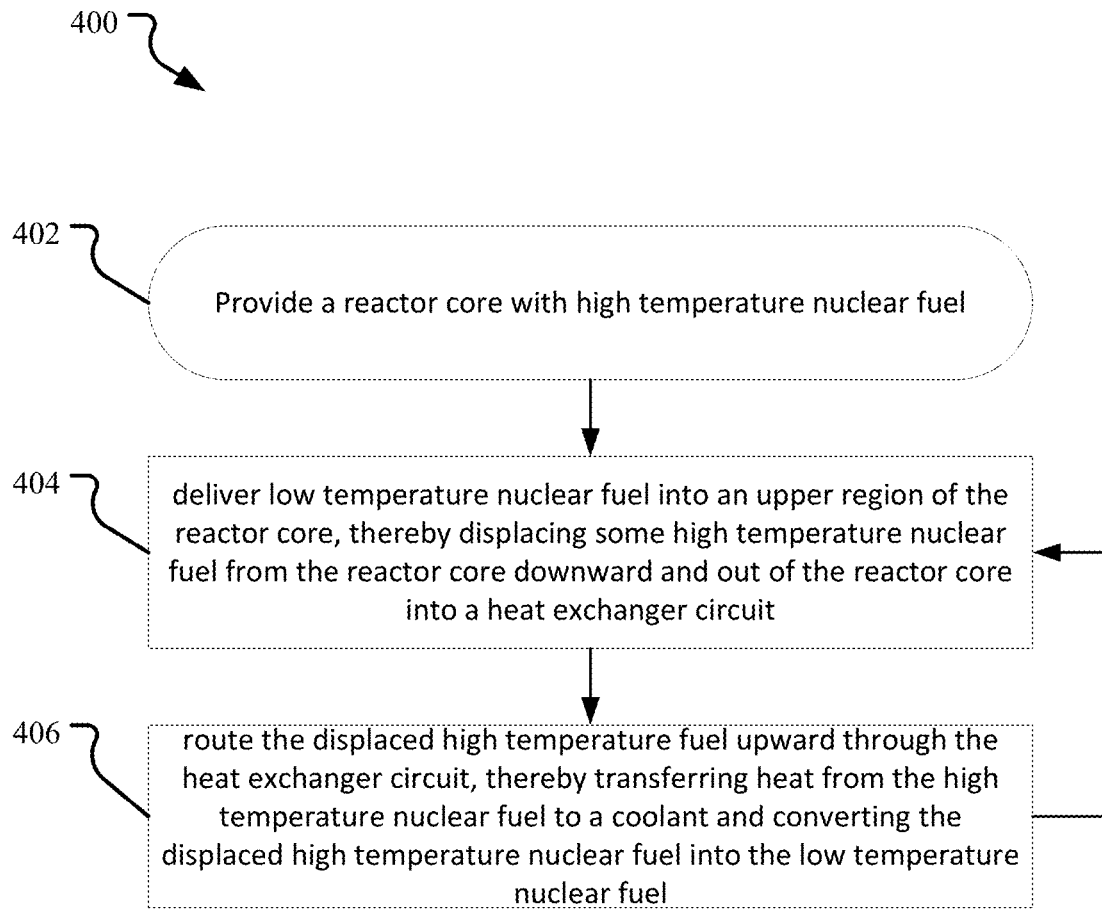
FIG. 4 illustrates an embodiment of a method for operating a reactor in a reverse flow mode.

FIG. 4 illustrates the reverse fuel flow method as a flow chart. In the embodiment of the method 400 shown, the method starts with providing molten salt nuclear reactor having a reactor core as described above in operation 402. Reverse flow circulation starts with a cooled fuel salt injection operation 404. In this operation 404, low temperature nuclear fuel is delivered into an upper region of the reactor core, thereby displacing some high temperature nuclear fuel from the reactor core downward and out of the reactor core into a heat exchanger circuit. A heated fuel salt removal and cooling operation 406 is then performed. In this operation 406, the displaced high temperature fuel is removed from the reactor and flowed upward through the heat exchanger circuit, thereby transferring heat from the high temperature nuclear fuel to a coolant and converting the displaced high temperature nuclear fuel into the low temperature nuclear fuel.

This reverse fuel salt flow technique in a molten fuel salt reactor, where the natural circulation direction and the operational fuel salt circulation direction are opposite, may be used with any molten fuel salt reactor core geometry and is not limited to use with reactors having DRACS heat exchangers. In an alternative embodiment, one-way vales may be provided in the fuel salt loop to change the circulation path of the fuel depending on whether the reactor is under forced flow or natural circulation. For example, in an embodiment, one-way valves may be installed in some or all the ducts connecting the reactor core to the heat exchangers so that during natural circulation all fuel salt flow is directed through only some of the heat exchanger legs (or only some of the tubes within the heat exchangers) while during normal operation all eight of the heat exchanger legs and all of the tubes in the heat exchanger tubesets.

Note that natural circulation during loss of forced flow events is now opposite that of the flow during normal operation. In the event of loss of forced flow, this means that there will be some period of time before the salt flow can reverse directions and the steady state natural circulation flow is achieved.

Horizontal Coolant Flow Primary Heat Exchanger

Figure 3A:
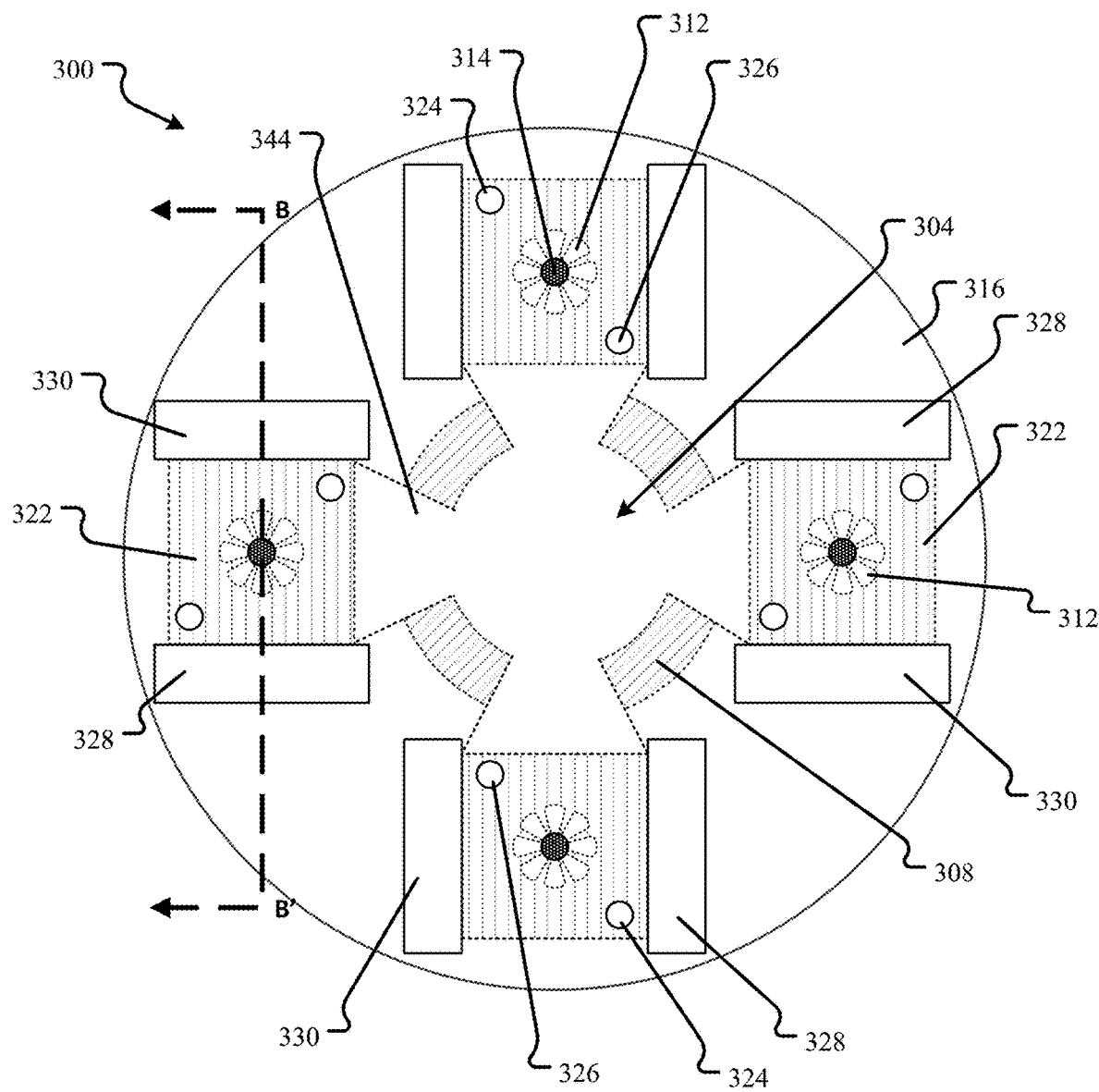
FIGS. 3A and 3B illustrate different views and components of an alternative embodiment of a molten fuel reactor with a horizontal coolant flow through the heat exchangers.
Figure 3B:
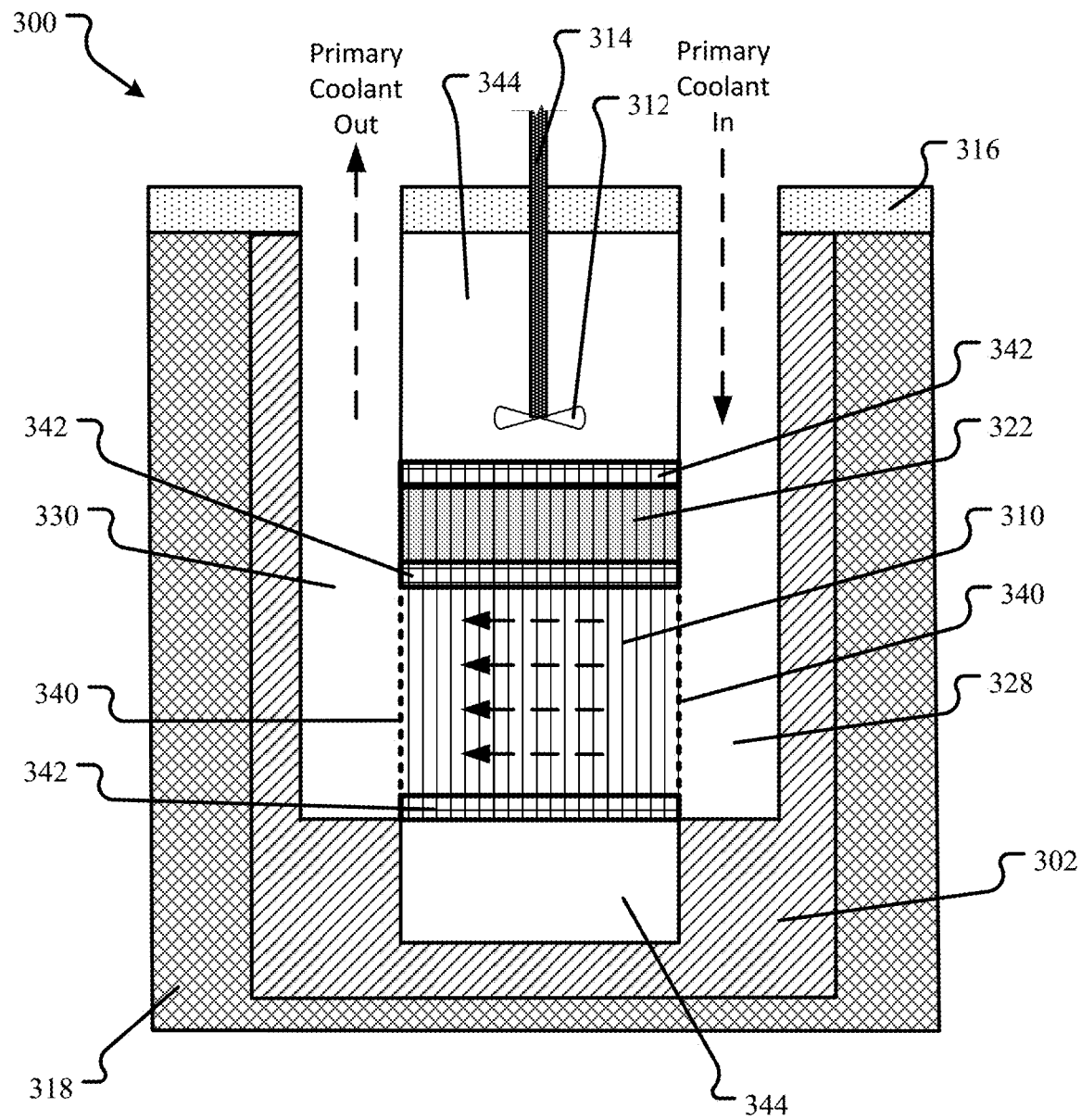

FIGS. 3A-3B illustrate different views and components of an alternative embodiment of a molten fuel reactor with a horizontal coolant flow through the heat exchangers. FIG. 3A is a plan view of a reactor 300 illustrating the locations of various ducts and components penetrating and below the reactor head 316. FIG. 3B is a sectional view of the reactor 300 taken along section line B-B' of FIG. 3A.

In the embodiment shown, similar to those described with reference to FIGS. 1 and 2A-2D, the reactor 300 includes a reactor core 304 filled with fuel salt. The reactor core 304 is defined by a cylindrical reflector 308, and a lower reflector 302. In the embodiment shown, four heat exchanger circuits, each including a DRACS heat exchanger 322 and a PHX 310, are spaced around the reactor core 304. Fuel salt transfer ducts 344 are provided at the top and the bottom of the reactor core 304 that provide a flow path between the core and each of the four heat exchanger circuits. The reactor core 304, reflectors, and heat exchanger circuits are within an open-topped containment vessel 318 that is capped with a vessel head 316. Forced flow of the fuel salt is driven by four impellers 312, each impeller 312 driven by a shaft 314 that penetrates the vessel head 316.

During a loss of forced flow event the reactor 300 forms a natural circulation cell with fuel salt flowing upward through the reactor core 304 and downward through the heat exchanger circuits. The reactor 300 may be operated with reversed flow during normal operation as described above with reference to FIGS. 2C and 2D. In this reversed flow embodiment, the impellers 312 are designed to cause the fuel to be flowed from the top of the heat exchanger circuit into the upper region/top of the reactor core 304.

The reactor 300 differs, at least in part, from the reactors described above in its routing of primary coolant through at least the PHX 310. In the embodiment shown, both the DRACS heat exchangers 322 and the PHXs 310 are shell and tube heat exchangers that include a shell containing multiple tubes (again, referred to collectively as the tubeset or tube bundle) and capped at either end by a tube sheet 342. In addition, as illustrated the two heat exchangers 310, 322 in each heat exchanger circuit share a shell and the tubes of the tubeset, the DRACS coolant being separated from the primary coolant by an intermediate tube sheet within the shared shell. The primary coolant through each PHX 310 is delivered to the side of PHX 310 and flowed horizontally past the tubes rather than being forced to follow some circuitous path between different vertical levels within the PHX 310. This is achieved by delivering the coolant into each PHX 310 through one sidewall and removing the coolant from the opposite sidewall, thus creating a horizontal flow of coolant through the tubeset between the two opposite sidewalls. Alternatively, a plate heat exchanger design (not shown) could be utilized.

In the embodiment shown, the inlet duct 328 and coolant return duct 330 for each PHX are located on opposite sides of each PHX 310. Thus, cold coolant flows through the inlet duct 328 to a chamber that includes a perforated sidewall 340 (best seen in FIG. 3B) in the shell of the PHX 310. The coolant flows through the perforated sidewall 340 into the PHX 310 and horizontally past the tubes in the tubeset, thus cooling the fuel salt flowing vertically through the tubeset. The heated coolant flows horizontally to the opposite side of the PHX 310, exits the PHX 310 through the perforated sidewall 340 and exits the reactor 300 via the return duct 330.

In the embodiment shown, each inlet duct 328 is located counter-clockwise (as shown in FIG. 3A) relative to its associated PHX 310. In an alternative embodiment (not shown), inlet ducts 328 for adjacent PHXs 310 may be co-located and share a wall or may be a single duct that serves two different PHXs. The return ducts 330 may be similarly co-located between different sets of adjacent PHXs 310. In this configuration, the walls between co-located ducts need not be insulated as they are routing coolant of the same temperature to different heat exchangers. In an alternative embodiment, the wall between co-located ducts may be eliminated altogether.

The DRACS DHHX 322 may or may not also be designed to utilize horizontal flowing coolant. In the embodiment shown, the DRACS coolant is delivered to the top of one corner of the DHHX by a DRACS coolant inlet pipe 324 and removed from the top of an opposing corner by a DRACS coolant return pipe 326. To ensure horizontal flow through the DHHX, the DRACS coolant may be delivered to and removed from opposing chambers within the DHHX shell. The chambers may be provided with perforated sidewalls (not shown) so that they act as a manifold and deliver and remove coolant horizontally from the region of the shell that contains the tubeset, similar to how the coolant is delivered into the PHXs 310.

As discussed above, various baffles, contours and other equipment for evenly delivering coolant flow into and out of the heat exchangers may be provided, such as in the ducts 328, 330, the sidewalls and/or within the heat exchanger shells.

Figure 5A:
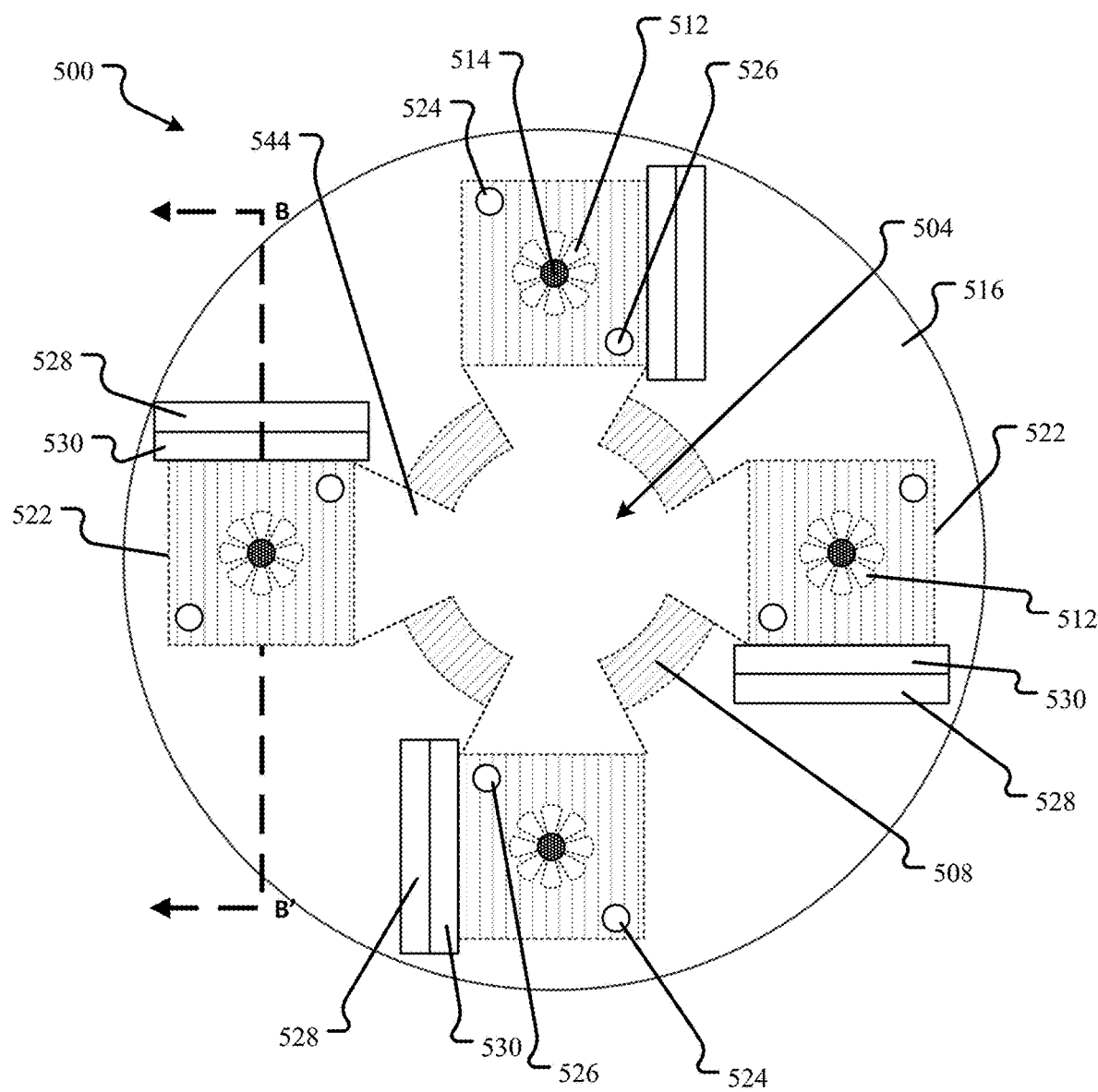
FIGS. 5A-5B illustrate different views and components of yet another embodiment of a molten fuel reactor with a horizontal coolant flow through the heat exchangers.
Figure 5B:
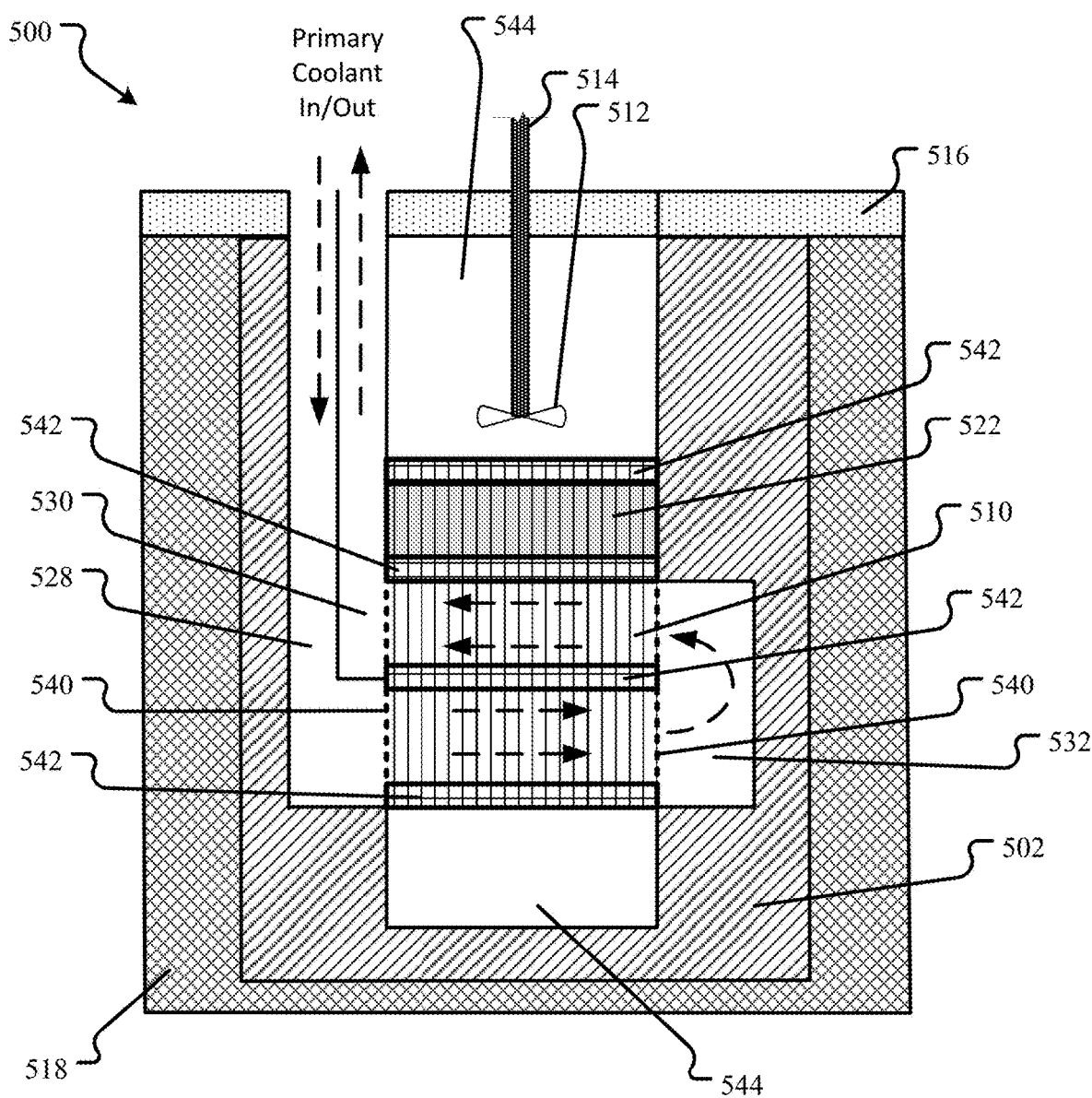

FIGS. 5A-5B illustrate different views and components of yet another embodiment of a molten fuel reactor with a horizontal coolant flow through the heat exchangers. FIG. 5A is a plan view of a reactor 500 illustrating the locations of various ducts and components penetrating and below the reactor head 516. FIG. 5B is a sectional view of the reactor 500 taken along section line B-B' of FIG. 5A.

In the embodiment shown, similar to those described with reference to FIGS. 1 and 2A-2D, the reactor 500 includes a reactor core 504 filled with fuel salt. The reactor core 504 is defined by a cylindrical reflector 508, an upper reflector 506 and a lower reflector 502. In the embodiment shown, four heat exchanger circuits, each including a DRACS heat exchanger 522 and a PHX 510, are spaced around the reactor core 504. Fuel salt transfer ducts 544 are provided at the top and the bottom of the reactor core 504 that provide a flow path between the core and each of the four heat exchanger circuits. The reactor core 504, reflectors, and heat exchanger circuits are within an open-topped containment vessel 518 that is capped with a vessel head 516. Forced flow of the fuel salt is driven by four impellers 512, each impeller 512 driven by a shaft 514 that penetrates the vessel head 516.

The reactor 500 differs, at least in part, from the reactors described above in its split routing of primary coolant through at least the PHX 510. In the embodiment shown, both the DRACS heat exchangers 522 and the PHXs 510 are shell and tube heat exchangers that include a shell containing multiple tubes (again, referred to collectively as the tubeset or tube bundle) and capped at either end by a tube sheet 542. As in FIG. 3B, the DRACS heat exchanger and the PHX 510 share a shell and the tubes of the tubeset, the DRACS coolant being separated from the primary coolant by an intermediate tube sheet 542 within the shared shell.

The split primary coolant flow embodiment 500 differs that shown in FIG. 3B in the flow path and ducts for the primary coolant through each PHX 510. In the split flow embodiment the PHX 510 is separated by a tube sheet 542 into two zones. The primary coolant flows through a first, lower zone as shown and is then routed by an intermediate duct 532 to the upper zone and out of the reactor 500. Again, the primary coolant is flowed horizontally past the tubes rather than being forced to follow some circuitous path between different vertical levels within the PHX 510. This is achieved by delivering the coolant into each PHX 510 through one sidewall and removing the coolant from the opposite sidewall, thus creating a horizontal flow of coolant through the tubeset between the two opposite sidewalls. In the embodiment shown, the coolant makes two passes through the PHX 510 so that the coldest coolant passes by the tubes containing the coolest fuel salt. In order to achieve the same cooling as that of FIGS. 3A-3B assuming a PHX of the same size, the mass velocity of the primary coolant must be increased by a factor of two. In an embodiment, the flows of primary coolant and molten fuel salt are selected so that the total heat removed equals the total fuel salt power released. In the embodiment of FIGS. 5A-5B, the path length of the primary coolant through the shell is doubled relative to that of FIGS. 3A-3B. Therefore, due to these two effects, the primary coolant pressure drop between inlet and outlet will rise.

One aspect of the embodiment of FIGS. 5A-5B is a more even fuel salt temperature profile of fuel salt exiting the PHX 510. The fuel salt temperature issuing between the upper and lower halves of the PHX 510 has a maldistribution, since the primary coolant entering the upper half from the right is cooler than that leaving on the left. The fuel salt temperature in the tubes on the left is therefore higher. The lower half of the PHX 510, however, has the cooler primary coolant entering on the left side, which will cool the warmer fuel salt entering via the tubes on the left side. This configuration reduces or removes the maldistribution from the fuel salt issuing from the bottom half of the PHX 510 relative to the embodiment shown in FIGS. 3A-3B.

In the embodiment shown, the inlet duct 528 and coolant return duct 530 for each PHX are located on the same side of their associated PHX 510. Thus, cold coolant flows through the inlet duct 528 to a chamber that includes a perforated sidewall 540 in the shell of the PHX 510. The coolant flows through the perforated sidewall 540 into the PHX 510 and horizontally past the tubes in the tubeset, thus cooling the fuel salt flowing vertically through the tubeset. The heated coolant flows horizontally to the opposite side of the PHX 510, exits the PHX 510 through the perforated sidewall 540 and exits the reactor 500 via the return duct 530. In an alternative embodiment (not shown), inlet ducts 528 for adjacent PHXs 510 may be co-located and share a wall or may be a single duct that serves two adjacent PHXs.

The DRACS DHHX 522 may or may not also be designed to utilize horizontal flowing coolant. In the embodiment shown, the DRACS coolant is delivered to the top of one corner of the DHHX by a DRACS coolant inlet pipe 524 and removed from the top of an opposing corner by a DRACS coolant return pipe 526. To ensure horizontal flow through the DHHX, the DRACS coolant may be delivered to and removed from opposing chambers within the DHHX shell. The chambers may be provided with perforated sidewalls (not shown) so that they act as a manifold and deliver and remove coolant horizontally from the region of the shell that contains the tubeset, similar to how the coolant is delivered into the PHXs 510.

Figure 6A:
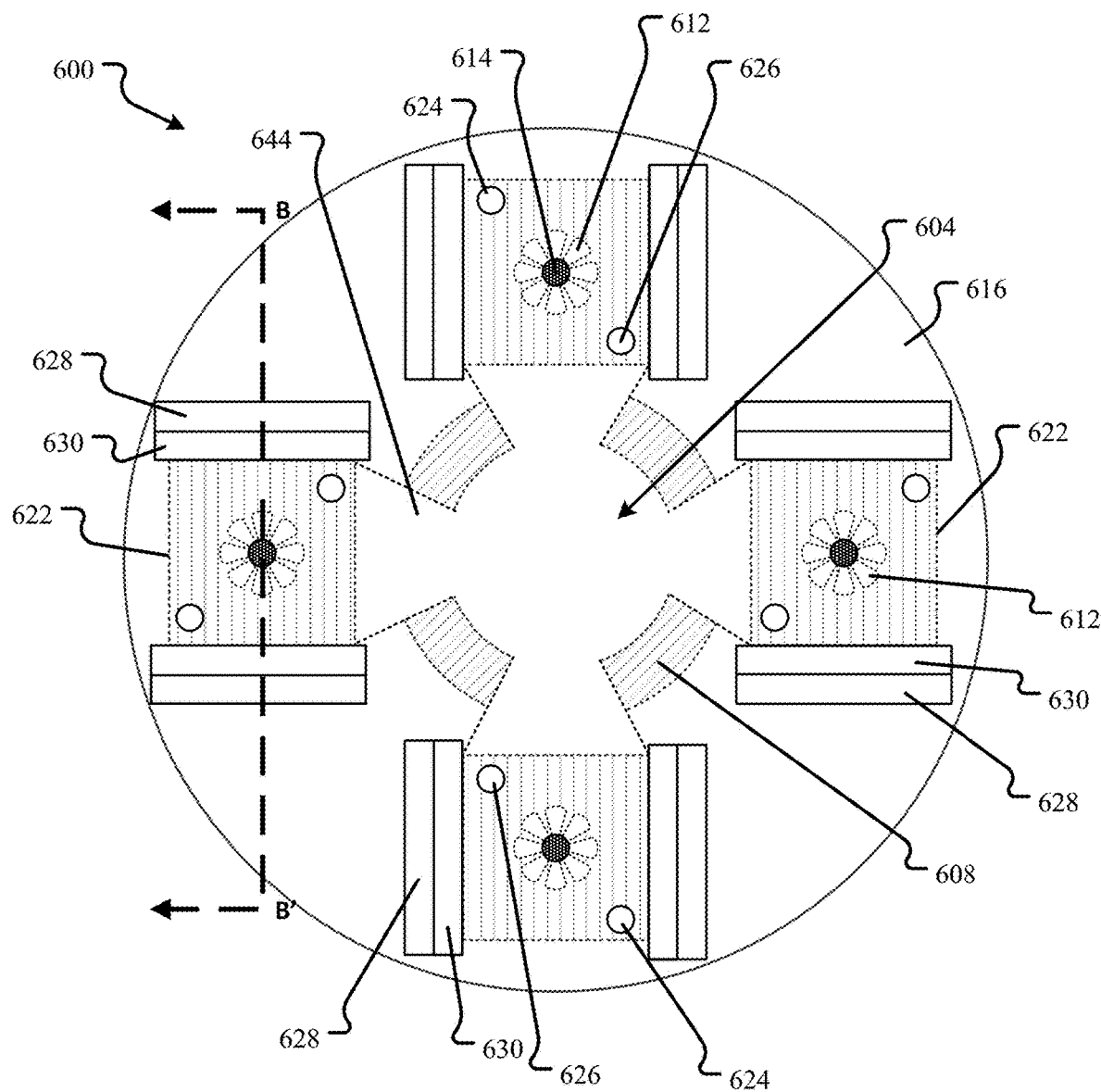
FIGS. 6A-6B illustrate different views and components of an alternative split primary coolant flow embodiment of a molten fuel reactor with a horizontal coolant flow through the heat exchangers.
Figure 6B:
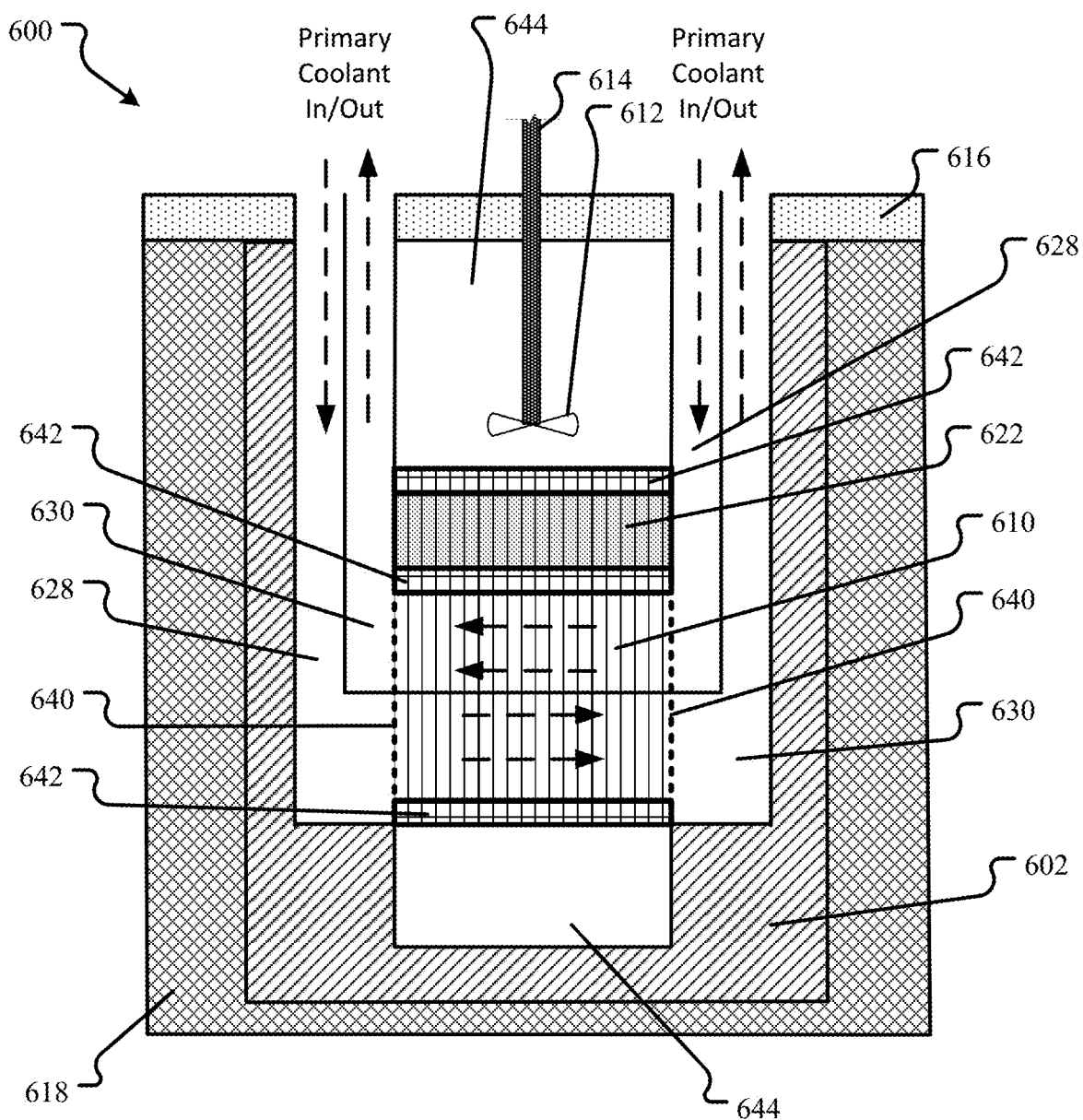

FIGS. 6A-6B illustrate different views and components of an alternative split primary coolant flow embodiment of a molten fuel reactor with a horizontal coolant flow through the heat exchangers. FIG. 6A is a plan view of a reactor 600 illustrating the locations of various ducts and components penetrating and below the reactor head 616. FIG. 6B is a sectional view of the reactor 600 taken along section line B-B' of FIG. 6A.

In the embodiment shown, similar to those described with reference to FIGS. 3A-3B and 5A-5B, the reactor 600 includes a reactor core 604 filled with fuel salt. The reactor core 604 is defined by a cylindrical reflector 608, an upper reflector 606, and a lower reflector 602. In the embodiment shown, four heat exchanger circuits, each including a DRACS heat exchanger 622 and a PHX 610, are spaced around the reactor core 604. Fuel salt transfer ducts 644 are provided at the top and the bottom of the reactor core 604 that provide a flow path between the core and each of the four heat exchanger circuits. The reactor core 604, reflectors, and heat exchanger circuits are within an open-topped containment vessel 618 that is capped with a vessel head 616. Forced flow of the fuel salt is driven by four impellers 612, each impeller 612 driven by a shaft 614 that penetrates the vessel head 616.

During a loss of forced flow event the reactor 600 forms a natural circulation cell with fuel salt flowing upward through the reactor core 604 and downward through the heat exchanger circuits. The reactor 600 may be operated with reversed flow during normal operation as described above with reference to FIGS. 2C and 2D. In this reversed flow embodiment, the impellers 612 are designed to cause the fuel to be flowed from the top of the heat exchanger circuit into the upper region/top of the reactor core 604.

The reactor 600 differs, at least in part, from the reactors described above in its routing of primary coolant through at least the PHX 610. In the embodiment shown, both the DRACS heat exchangers 622 and the PHXs 610 are shell and tube heat exchangers that include a shell containing multiple tubes (again, referred to collectively as the tubeset or tube bundle) and capped at either end by a tube sheet 642. In addition, as illustrated the two heat exchangers in each heat exchanger circuit share the shell and the tubes of the tubeset, the DRACS coolant being separated from the primary coolant by an intermediate tube sheet within the shared shell. The primary coolant through each PHX 610 is delivered to the side of PHX 610 and flowed horizontally past the tubes rather than being forced to follow some circuitous path between different vertical levels within the PHX 610. This is achieved by delivering the coolant into each PHX 610 through one sidewall and removing the coolant from the opposite sidewall, thus creating a horizontal flow of coolant through the tubeset between the two opposite sidewalls. Alternatively, a plate heat exchanger design (not shown) could be utilized.

In the embodiment shown, the inlet duct 628 and coolant return duct 630 for each PHX are located on opposite sides of each PHX 610. Thus, cold coolant flows through the inlet duct 628 to a chamber that includes a perforated sidewall 640 (best seen in FIG. 6B) in the shell of the PHX 610. The coolant flows through the perforated sidewall 640 into the PHX 610 and horizontally past the tubes in the tubeset, thus cooling the fuel salt flowing vertically through the tubeset. The heated coolant flows horizontally to the opposite side of the PHX 610, exits the PHX 610 through the perforated sidewall 640 and exits the reactor 600 via the return duct 630.

In the embodiment shown, each inlet duct 628 is located counter-clockwise (as shown in FIG. 6A) relative to its associated PHX 610. In an alternative embodiment (not shown), inlet ducts 628 for adjacent PHXs 610 may be co-located and share a wall or may be a single duct that serves two different PHXs. The return ducts 630 may be similarly co-located between different sets of adjacent PHXs 610. In this configuration, the walls between co-located ducts need not be insulated as they are routing coolant of the same temperature to different heat exchangers. In an alternative embodiment, the wall between co-located ducts may be eliminated altogether.

The DRACS DHHX 622 may or may not also be designed to utilize horizontal flowing coolant. In the embodiment shown, the DRACS coolant is delivered to the top of one corner of the DHHX by a DRACS coolant inlet pipe 624 and removed from the top of an opposing corner by a DRACS coolant return pipe 626. To ensure horizontal flow through the DHHX, the DRACS coolant may be delivered to and removed from opposing chambers within the DHHX shell. The chambers may be provided with perforated sidewalls (not shown) so that they act as a manifold and deliver and remove coolant horizontally from the region of the shell that contains the tubeset, similar to how the coolant is delivered into the PHXs 610.

One aspect of the embodiment of FIGS. 6A-6B is a more even fuel salt temperature profile of fuel salt exiting the PHX 610. Unlike the embodiment shown in FIGS. 5A-5B, however, this is achieved without doubling the path length of primary coolant flow, but rather by splitting the primary coolant flow in half. Again, the fuel salt temperature issuing between the upper and lower halves of the PHX 610 has a maldistribution, since the primary coolant entering the upper half from the right is cooler than that leaving on the left. The fuel salt temperature in the tubes on the left is therefore higher. The lower half of the PHX 610, however, has the cooler primary coolant entering on the left side, which will cool the warmer fuel salt entering via the tubes on the left side. This configuration reduces or removes the maldistribution from the fuel salt issuing from the bottom half of the PHX 610 relative to the embodiment shown in FIGS. 3A-3B.

Notwithstanding the appended claims, the disclosure is also defined by the following clauses:

1. A molten fuel nuclear reactor comprising:
   at least one reflector surrounding a reactor core, the reactor core for containing nuclear fuel and having an upper region and a lower region;
   a heat exchanger circuit separated from the reactor core by a reflector, the heat exchanger circuit having a first connection to the upper region and a second connection to the lower region and the heat exchanger circuit including:
      a DRACS heat exchanger configured to remove heat from the nuclear fuel and transfer the heat to a DRACS coolant;
      a primary heat exchanger that is a shell and tube heat exchanger in which a shell-side primary coolant removes heat from vertical tubes containing nuclear fuel;
      the DRACS heat exchanger located above and fluidicly connected to the primary heat exchanger and the DRACS heat exchanger fluidicly connected to the upper region of the reactor core via the first connection;

the vertical tubes of the primary heat exchanger fluidicly connected to the lower region of the reactor core via the second connection; and an impeller configured to drive circulation of the nuclear fuel in a direction opposite of that driven by natural circulation of the nuclear fuel.

2. The molten fuel nuclear reactor of clause 1 further comprising:

a primary coolant system that directs the flow of the primary coolant horizontally past the vertical tubes containing nuclear fuel.

3. The molten fuel nuclear reactor of clause 1 or 2, wherein the DRACS coolant is provided by a DRACS coolant system that is independent of a primary coolant system.

4. The molten fuel nuclear reactor of clause 1 or any clause which depends from clause 1, wherein the primary coolant flows through an inlet duct to a chamber that includes a first perforated sidewall in the shell of the primary heat exchanger.

5. The molten fuel nuclear reactor of clause 1 or any clause which depends from clause 1, wherein the coolant flows through the first perforated sidewall into the shell, horizontally past the tubes, thus cooling the nuclear fuel flowing vertically through the tubes.

6. The molten fuel nuclear reactor of clause 1 or any clause which depends from clause 1, wherein heated coolant exits the primary heat exchanger through a second perforated sidewall opposite the first perforated sidewall and exits the reactor via a return duct.

7. The molten fuel nuclear reactor of clause 1 or any clause which depends from clause 1, wherein the DRACS heat exchanger is a shell and tube heat exchanger and the tubes of the DRACS heat exchanger are fluidicly connected to the tubes of the primary heat exchanger.

8. The molten fuel nuclear reactor of clause 1 or any clause which depends from clause 1, wherein in absence of flow driven by the impeller, natural circulation drives the flow of nuclear fuel through the reactor core and at least the DRACS heat exchanger, the natural circulation created by a temperature difference between high temperature fuel in the reactor core and the lower temperature fuel exiting the heat exchanger circuit.

9. The molten fuel nuclear reactor of clause 1 or any clause which depends from clause 1, wherein the reactor core is configured to use nuclear fuel in the form of a salt of chloride, bromide, and/or fluoride.

10. The molten fuel nuclear reactor of clause 9, wherein the nuclear fuel contains one or more of uranium, plutonium, or thorium.

11. The molten fuel nuclear reactor of clause 1 or any clause which depends from clause 1, wherein the DRACS heat exchanger and the primary heat exchanger are contained within a single shell.

12. The molten fuel nuclear reactor of clause 1 or any clause which depends from clause 1, wherein the impeller may be raised or lowered, thereby changing a level of the nuclear fuel in the reactor.

13. The molten fuel nuclear reactor of clause 1 or any clause which depends from clause 1, wherein the molten fuel nuclear reactor further includes a fuel displacement device that controls the level of nuclear fuel in the reactor.

14. The molten fuel nuclear reactor of clause 1 or any clause which depends from clause 1, wherein the shell of the primary heat exchanger is separated into a first section and second section and wherein primary coolant flow through the first section is in a horizontal direction opposite of the primary coolant flow through the second section.

15. The molten fuel nuclear reactor of clause 14, wherein the primary coolant flow exiting the first section is routed to flow through the second section.

16. The molten fuel nuclear reactor of clause 14, wherein the first section is above the second section.

17. A method for removing heat from a molten fuel nuclear reactor having a reactor core containing high temperature nuclear fuel, the method comprising:

delivering low temperature nuclear fuel into an upper region of the reactor core, thereby displacing some high temperature nuclear fuel from the reactor core downward and out of the reactor core into a heat exchanger circuit;

routing high temperature fuel upwardly through the heat exchanger circuit, thereby transferring heat from the high temperature nuclear fuel to a coolant and converting the displaced high temperature nuclear fuel into the low temperature nuclear fuel.

18. The method of clause 17, wherein delivering the low temperature nuclear fuel into the reactor core includes passing the low temperature nuclear fuel from a DRACS heat exchanger into the upper region of the reactor core.

19. The method of clause 17 or 18, wherein delivering the low temperature nuclear fuel includes operating at least one impeller to drive flow of the nuclear fuel through the heat exchanger circuit in a direction opposite that of the natural circulation of fuel created by a temperature difference between high temperature fuel in the reactor core and the lower temperature fuel exiting the heat exchanger circuit in the absence of the operation of the impeller.

20. The method of clause 17 or any clause which depends from clause 17, neutronically shielding the heat exchanger circuit including a primary heat exchanger and a DRACS heat exchanger from neutrons generated in the reactor core.

21. The method of clause 17 or any clause which depends from clause 17, flowing coolant horizontally past tubes in the primary heat exchanger from a first side of the primary heat exchanger to a second side opposite the first side.

22. An apparatus for delivering cooled fuel salt into a reactor core comprising:

a wall surrounding the reactor core and separating the reactor core from a plenum, the wall provided with a plurality of perforations penetrating the wall and permitting flow of nuclear fuel salt between the reactor core and the plenum; and a plenum inlet for receiving cooled nuclear fuel salt into the plenum.

23. The apparatus of clause 22, wherein the plurality of perforations are arranged into at least two horizontal rows of perforations.

24. The apparatus of clause 22 or 23, wherein at least one of the perforations in the plurality of perforations is a cylindrical hole through the wall having a central axis that is not parallel with the horizontal plane.

25. The apparatus of clause 22 or any clause which depends from clause 22, wherein at least one of the perforations in the plurality of perforations is a frustoconically shaped hole through the wall.

26. The apparatus of clause 23 or any clause which depends from clause 22, wherein at least one of the perforations in the plurality of perforations is a frustoconically shaped hole through the wall having a central axis that is not parallel with the horizontal plane.

Notwithstanding that the numerical ranges and parameters setting forth the broad scope of the technology are approximations, the numerical values set forth in the specific examples are reported as precisely as possible. Any numerical values, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. For example, manifolds may be used in place of perforated sidewalls or chambers to more precisely control the flow of coolant into and out heat exchanger shells. Numerous other changes may be made which will readily suggest themselves to those skilled in the art and which are encompassed in the spirit of the disclosure.

What is claimed is:

1. A molten fuel nuclear reactor comprising:
   at least one reflector surrounding a reactor core, the reactor core for containing a portion of the nuclear fuel and having an upper region and a lower region;
   a heat exchanger circuit separated from the reactor core by a reflector, the heat exchanger circuit connected to the upper region via an upper fuel salt transfer duct and connected to the lower region via a lower fuel salt transfer duct and the heat exchanger circuit including:
      a direct reactor auxiliary cooling system (DRACS) heat exchanger wherein the DRACS heat exchanger is a shell and tube heat exchanger having a first shell and a plurality of vertical tubes passing through the first shell configured to remove heat from nuclear fuel flowing through the plurality of vertical tubes and transfer the heat to a DRACS coolant;
      a primary heat exchanger that is a shell and tube heat exchanger having a second shell though which the plurality of vertical tubes also passes, the primary heat exchanger configured to remove heat from nuclear fuel flowing through the plurality of vertical tubes and transfer the heat to a primary coolant;
      the DRACS heat exchanger located above the primary heat exchanger;
      the plurality of vertical tubes fluidicly connected at an upper end to the upper region of the reactor core via the upper fuel salt transfer duct and at the lower end to the lower region of the reactor core via the lower fuel salt transfer duct;
   an impeller configured to drive circulation of the nuclear fuel through the plurality of vertical tubes;
   wherein the first shell of the DRACS heat exchanger and the second shell of the primary heat exchanger are a continuous shell separated by an internal tubesheet through which the plurality of vertical tubes penetrate, the internal tubesheet configured to separate the DRACS coolant from the primary coolant; and
   wherein all nuclear fuel that flows through the plurality of vertical tubes of the heat exchanger circuit flows through both the DRACS heat exchanger and the primary heat exchanger.

2. The molten fuel nuclear reactor of claim 1 further comprising:
   a primary coolant system that directs the flow of the primary coolant horizontally past the vertical tubes containing nuclear fuel.

3. The molten fuel nuclear reactor of claim 1, wherein the DRACS coolant is provided by a DRACS coolant system that is independent of a primary coolant system.

4. The molten fuel nuclear reactor of claim 1, wherein the primary coolant flows through an inlet duct to a chamber that includes a first perforated sidewall in the shell of the primary heat exchanger.

5. The molten fuel nuclear reactor of claim 1, wherein the primary coolant flows through the first perforated sidewall into the second shell, horizontally past the plurality of vertical tubes, thus cooling the nuclear fuel flowing vertically through the tubes.

6. The molten fuel nuclear reactor of claim 1, wherein heated coolant exits the primary heat exchanger through a second perforated sidewall opposite the first perforated sidewall and exits the reactor via a return duct.

7. The molten fuel nuclear reactor of claim 1, wherein in absence of flow driven by the impeller, natural circulation drives the flow of nuclear fuel through the reactor core and at least the DRACS heat exchanger, the natural circulation created by a temperature difference between high temperature fuel in the reactor core and the lower temperature fuel exiting the heat exchanger circuit.

8. The molten fuel nuclear reactor of claim 1, wherein the reactor core is configured to use nuclear fuel in the form of a salt of chloride, bromide, and/or fluoride.

9. The molten fuel nuclear reactor of claim 8, wherein the nuclear fuel contains one or more of uranium, plutonium, or thorium.

10. The molten fuel nuclear reactor of claim 1, wherein the impeller may be raised or lowered, thereby changing a level of the nuclear fuel in the reactor.

11. The molten fuel nuclear reactor of claim 1, wherein the molten fuel nuclear reactor further includes a fuel displacement device that controls the level of nuclear fuel in the reactor.

12. The molten fuel nuclear reactor of claim 1, wherein the second shell of the primary heat exchanger is separated into a first section and second section and wherein primary coolant flow through the first section is in a horizontal direction opposite of the primary coolant flow through the second section.

13. The molten fuel nuclear reactor of claim 12, wherein the primary coolant flow exiting the first section is routed to flow through the second section.

14. The molten fuel nuclear reactor of claim 12, wherein the first section is above the second section.

* * * * *